United States Patent
Lee et al.

(10) Patent No.: US 12,265,748 B2
(45) Date of Patent: Apr. 1, 2025

(54) ELECTRONIC DEVICE WITH VARIABLE DISPLAY AREA AND OPERATION METHOD THEREOF

(71) Applicant: SAMSUNG ELECTRONICS CO., LTD., Suwon-si (KR)

(72) Inventors: Gisoo Lee, Suwon-si (KR); Sangheon Kim, Suwon-si (KR); Changdo Kim, Suwon-si (KR); Taeyong Moon, Suwon-si (KR); Hyeongtaek Im, Suwon-si (KR); Yeunwook Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/411,088

(22) Filed: Jan. 12, 2024

(65) Prior Publication Data

US 2024/0143261 A1    May 2, 2024

Related U.S. Application Data

(63) Continuation of application No. 17/959,622, filed on Oct. 4, 2022, which is a continuation of application No. PCT/KR2022/011434, filed on Aug. 2, 2022.

(30) Foreign Application Priority Data

Aug. 5, 2021  (KR) .......................... 10-2021-0103276

(51) Int. Cl.
*G06F 3/14*    (2006.01)
*G06F 3/0488*    (2022.01)

(52) U.S. Cl.
CPC .......... *G06F 3/1423* (2013.01); *G06F 3/0488* (2013.01)

(58) Field of Classification Search
CPC ................. G06F 3/1423; G06F 3/0488; G06F 2203/04803; G06F 2203/04808;
(Continued)

(56) References Cited

U.S. PATENT DOCUMENTS 10,627,931 B2    4/2020    Chung
11,398,168 B2    7/2022    Knarr et al.
(Continued)

FOREIGN PATENT DOCUMENTS

KR    10-2012-0072947    7/2012
KR    10-2012-0079707    7/2012
(Continued)

OTHER PUBLICATIONS

U.S. Appl. No. 17/959,622, filed Oct. 4, 2022; LEE et al.
Search Report and Written Opinion dated Oct. 28, 2022 issued in International Patent Application No. PCT/KR2022/011434.

*Primary Examiner* — Grant Sitta
(74) *Attorney, Agent, or Firm* — NIXON & VANDERHYE P.C.

(57) ABSTRACT

According to an example embodiment, an electronic device outputs, on a second display screen, a page layout output on a first display screen along with another page layout grouped together with the page layout in response to a screen switch from the first display screen to the second display screen having a greater display area than a display area of the first display screen, and switches the grouped page layouts in response to a swipe input being detected.

10 Claims, 30 Drawing Sheets

(58) Field of Classification Search
CPC .... G06F 1/1652; G06F 1/1677; G06F 3/0483; G06F 3/0484; G06F 3/04883; G06F 3/04886; G06F 3/14; G06F 1/1647; G09G 2340/04; G09G 2354/00; G09G 2360/04; G09G 5/373; G09G 5/38
See application file for complete search history.

(56) References Cited

U.S. PATENT DOCUMENTS

| | | | |
|---|---|---|---|
| 11,842,031 | B2 | 12/2023 | Zhang et al. |
| 2013/0234951 | A1 | 9/2013 | Kim et al. |
| 2015/0338888 | A1 | 11/2015 | Kim |
| 2016/0147362 | A1* | 5/2016 | Eim ................. G06F 3/0416 345/173 |
| 2017/0147189 | A1 | 5/2017 | Ryu |
| 2017/0154609 | A1 | 6/2017 | Yoon |
| 2018/0081398 | A1 | 3/2018 | Shin |
| 2018/0364827 | A1 | 12/2018 | Chung |
| 2019/0012008 | A1 | 1/2019 | Yoon |
| 2019/0235687 | A1 | 8/2019 | Nam |
| 2019/0272091 | A1 | 9/2019 | Seo |
| 2020/0225706 | A1* | 7/2020 | Jung ................. H04M 1/0268 |
| 2021/0286480 | A1 | 9/2021 | Tyler et al. |
| 2022/0197584 | A1* | 6/2022 | Zheng ................. G06F 1/1641 |
| 2022/0326367 | A1* | 10/2022 | Matuszak .............. G06N 3/044 |

FOREIGN PATENT DOCUMENTS

| | | |
|---|---|---|
| KR | 2012-0092034 | 8/2012 |
| KR | 10-1522882 | 5/2015 |
| KR | 10-2016-0061816 | 6/2016 |
| KR | 10-2017-0060519 | 6/2017 |
| KR | 10-2019-0090982 | 8/2019 |
| KR | 2019-0092006 | 8/2019 |
| KR | 10-2047690 | 11/2019 |
| KR | 10-2021-0010603 | 1/2021 |
| KR | 10-2021-0088484 | 7/2021 |

\* cited by examiner

ELECTRONIC DEVICE WITH VARIABLE DISPLAY AREA AND OPERATION METHOD THEREOF

CROSS-REFERENCE TO RELATED APPLICATIONS

This application is a Continuation of U.S. application Ser. No. 17/959,622, filed Oct. 4, 2022, which is a Continuation of PCT/KR2022/011434 filed Aug. 2, 2022, which claims priority to KR 10-2021-0103276, filed on Aug. 5, 2021, the entire contents of which are all hereby incorporated herein by reference in their entireties.

BACKGROUND

1. Field

The disclosure relates to an electronic device with a variable display area and a method of operating the electronic device.

2. Description of Related Art

In a multi-display environment, a homescreen that is not synchronized may not provide continuity at a screen switch. For example, an external screen and an internal screen may be separately operated and displayed. Also, a displayable layout may vary according to the size of each display, providing an inconsistent screen. In addition, an item arrangement may need to be performed by a user according to the size of each display.

When a different display size is provided, setting the same grid size or icon size while configuring a homescreen on screens of different ratios or sizes may result in an unnatural configuration of one of the external screen and the internal screen. Thus, managing separate grids or data for each of the external screen and the internal screen may contribute to a configuration of separate screens between the external screen and the internal screen. In such a case, items may be set independently on each of the external screen and the internal screen. In the multi-display environment, the homescreen may not be synchronized between the internal screen and the external screen, and thus a displayable layout may differ according to the size of each display, which may degrade consistency.

SUMMARY

According to an example embodiment, an electronic device includes: a display module including a display having a screen configured to be switched from a first display screen to a second display screen having a display area greater than a display area of the first display screen; a memory in which computer-executable instructions are stored; and a processor configured to access the memory and execute the instructions. The instructions, when executed, may cause the processor to control the electronic device to: in response to the screen of the display module being switched from the first display screen to the second display screen, output, on the second display screen, a first view layout including a page layout output on the first display screen and another page layout grouped together with the page layout output on the first display screen; and in response to a screen switch input to the display module being detected, switch the second display screen from the first view layout to a second view layout including a destination page layout determined based on a number of pages displayable on the second display screen.

According to an example embodiment, a processor-implemented method includes: in response to a screen of a display module being switched from a first display screen to a second display screen having a display area greater than that of the first display screen, outputting, on the second display screen, a first view layout including a page layout output on the first display screen and another page layout grouped together with the page layout output on the first display screen; and in response to a screen switch input to the display module being detected, switching the second display screen from the first view layout to a second view layout including a destination page layout determined based on the number of pages displayable on the second display screen.

Other features and aspects will be apparent from the following detailed description, the drawings, and the claims.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
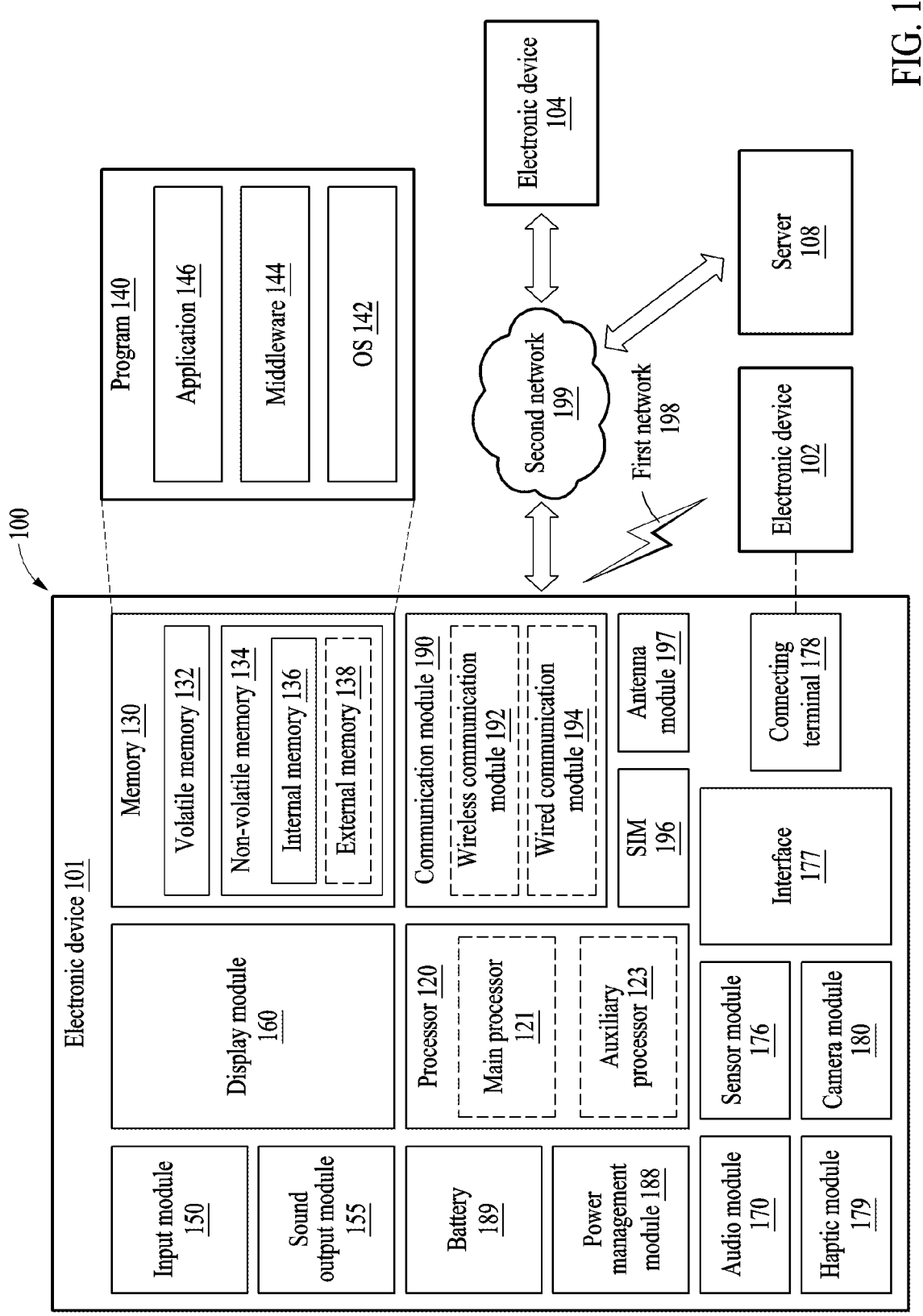
FIG. 1 is a block diagram illustrating an example electronic device in a network environment according to various embodiments.

Hereinafter, various example embodiments will be described in greater detail with reference to the accompanying drawings. When describing the example embodiments with reference to the accompanying drawings, like reference numerals refer to like elements and a repeated description related thereto will be omitted.

FIG. 1 is a block diagram illustrating an example electronic device in a network environment according to various example embodiments.

Referring to FIG. 1, an electronic device 101 in a network environment 100 may communicate with an electronic device 102 via a first network 198 (e.g., a short-range wireless communication network), or communicate with at least one of an electronic device 104 and a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In various example embodiments, at least one (e.g., the connecting terminal 178) of the above components may be omitted from the electronic device 101, or one or more other components may be added in the electronic device 101. In various example embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or data stored in the volatile memory 132, and store resulting data in a non-volatile memory 134. According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with, the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence (AI) model processing. An AI model may be generated by machine learning. Such learning may be performed by, for example, the electronic device 101 in which the AI model is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may alternatively or additionally include a software structure other than the hardware structure.

The memory 130 may store various data used by at least one component (e.g., the processor 120 or the sensor module 176) of the electronic device 101. The data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing records. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a display, a hologram device, or a projector, and a control circuitry to control a corresponding one of the display, the hologram device, and the projector. According to an example embodiment, the display module 160 may include a touch sensor adapted to sense a touch, or a pressure sensor adapted to measure an intensity of a force incurred by the touch. For example, the display module 160 may include a sub-display (e.g., a second display) to be described with reference to FIGS. 2 and 3 and a main display (e.g., a first display) to be described with reference to FIGS. 4A and 4B, and 5.

The audio module 170 may convert a sound into an electric signal or vice versa. According to an example embodiment, the audio module 170 may obtain the sound via the input module 150 or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with an external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, ISPs, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and an external electronic device (e.g., the electronic device 102, the electronic device 104, or the server 108) and performing communication via the established communication channel. The communication module 190 may include one or more communication processors that are operable independently of the processor 120 (e.g., an AP) and that support direct (e.g., wired) communication or wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multiple components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beamforming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated high-frequency band (e.g., the mmWave band), and a plurality of antennas (e.g., array antennas) disposed on a second surface (e.g., a top or a side surface) of the PCB or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general-purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an example embodiment, all or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least a part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least a part of a reply to the request. To that end, a cloud computing, distributed computing, mobile edge computing (MEC), or client-server computing technology may be used, for example. The electronic device 101 may provide ultra-low latency services using, e.g., distributed computing or mobile edge computing. In an example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
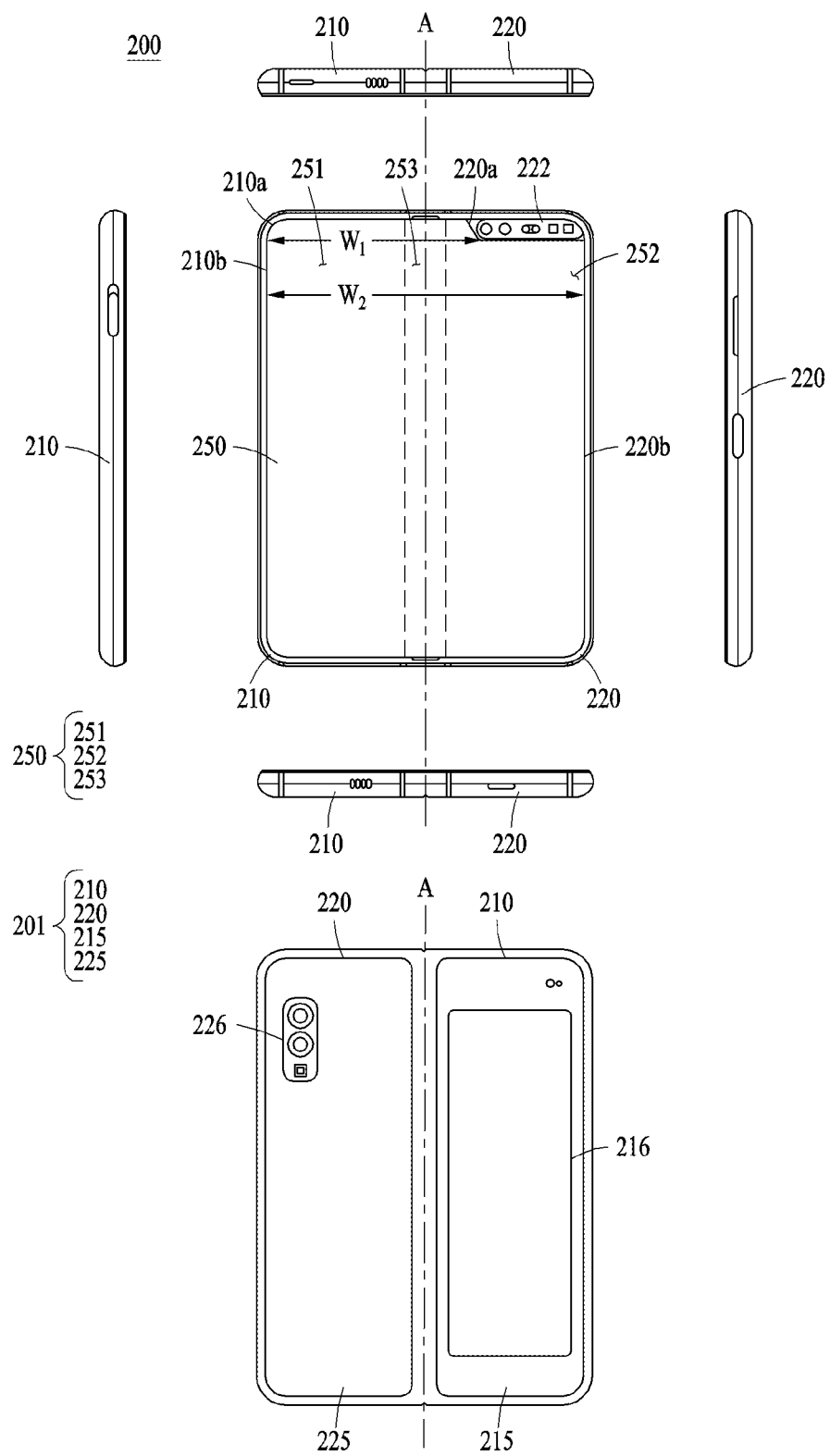
FIG. 2 is a diagram illustrating an example foldable electronic device in an unfolded state according to various embodiments.
Figure 3:
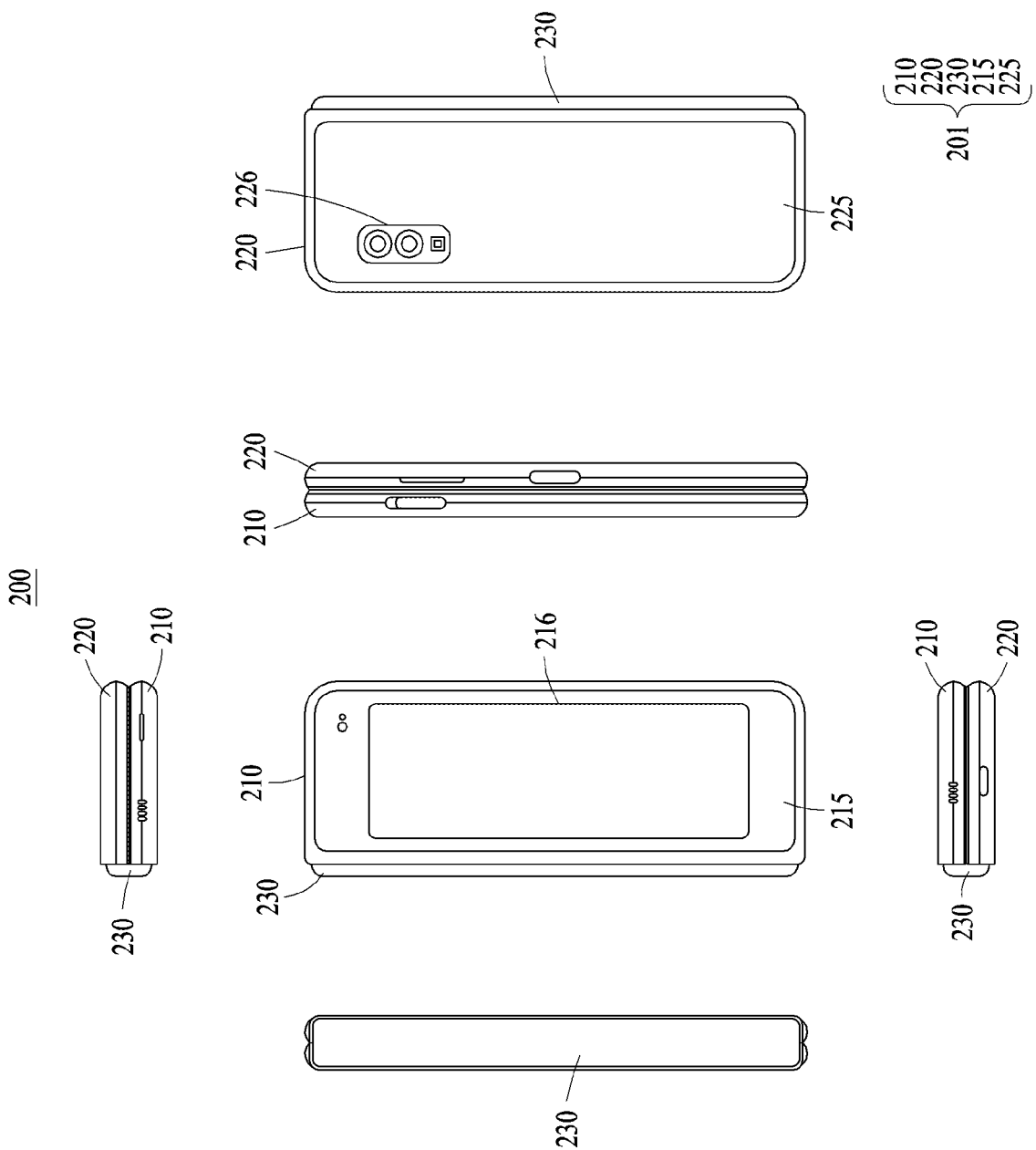
FIG. 3 is a diagram illustrating an example electronic device in a folded state according to various embodiments.
Figure 4A:
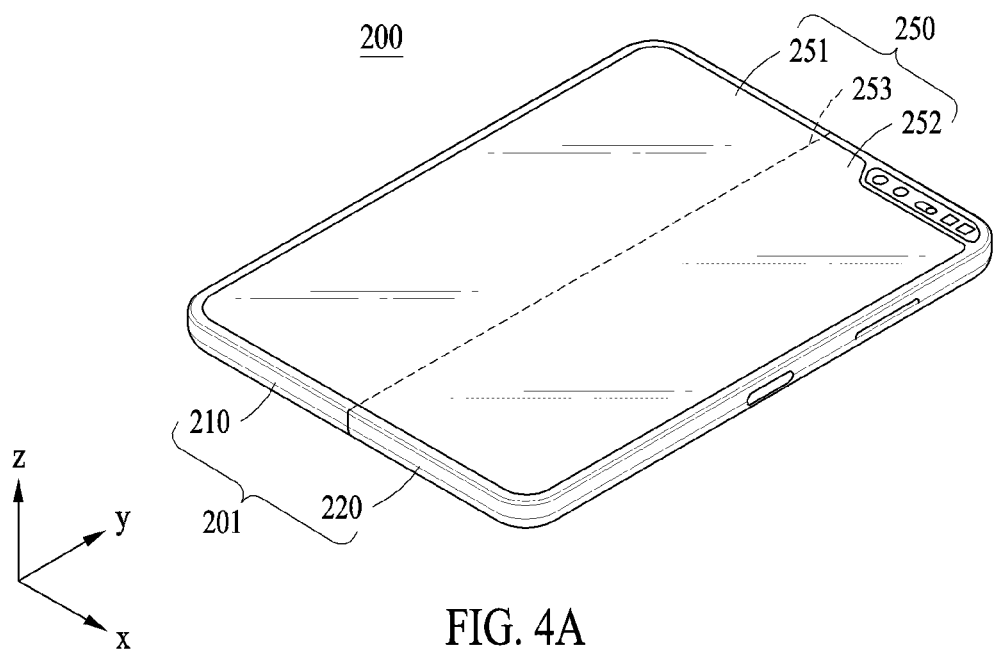
FIGS. 4A and 4B are perspective views of a foldable electronic device in a fully unfolded state and a partially unfolded state (or an intermediate state) according to various embodiments.
Figure 4B:
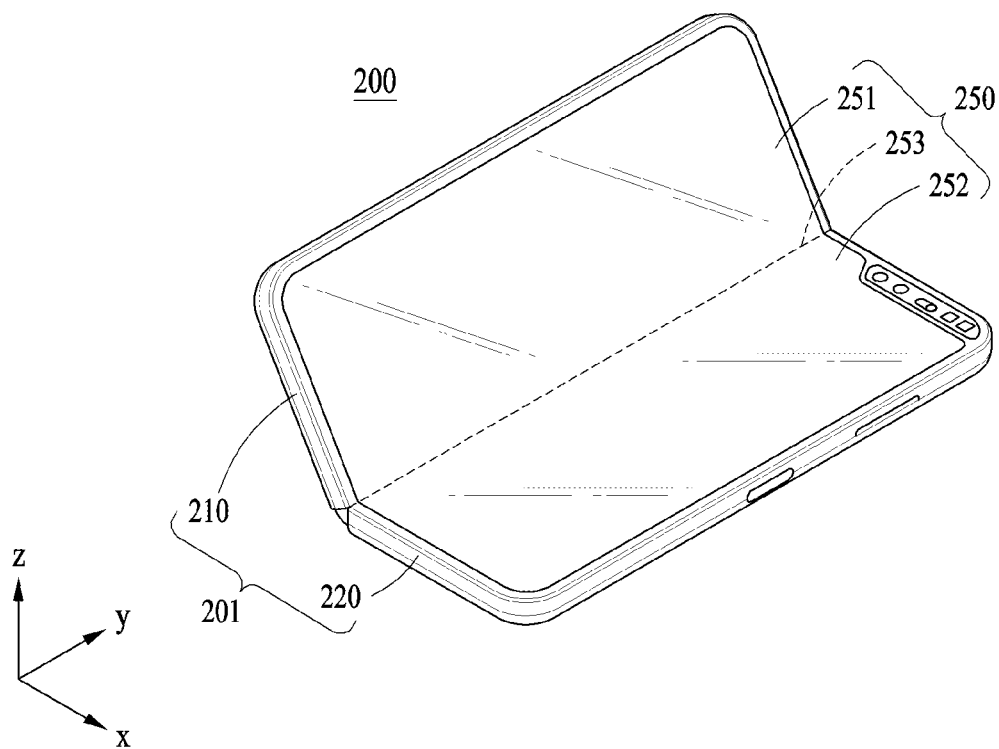

FIG. 2 is a diagram illustrating an example foldable electronic device in an unfolded state according to various embodiments. FIG. 3 is a diagram illustrating an example foldable electronic device in a folded state according to various embodiments. FIGS. 4A and 4B are perspective views of a foldable electronic device in a fully unfolded state and a partially unfolded state (or an intermediate state) according to various embodiments.

Referring to FIGS. 2, 3, and 4A and 4B, an electronic device 200, which is provided as an example of the electronic device 101 of FIG. 1, may be a foldable or bendable electronic device.

In FIGS. 4A and 4B, and other following drawings, illustrated is a spatial coordinate system defined by an X axis, a Y axis, and a Z axis that are orthogonal to each other. The X axis indicates a width direction of an electronic device, the Y axis indicates a longitudinal direction of the electronic device, and the Z axis indicates a height (or thickness) direction of the electronic device. In the following description, a first direction may indicate a direction parallel to the Z axis.

Referring to FIGS. 2 and 3, according to an example embodiment, the electronic device 200 may include a foldable housing 201, and a flexible or foldable main display 250 (hereinafter simply referred to as the "main display" 250) (e.g., the display module 160 of FIG. 1) disposed in a space formed by the foldable housing 201. A surface on which the main display 250 is disposed (or a surface on which the main display 250 is viewed from the outside of the electronic device 200) may be defined as a front surface of the electronic device 200. In addition, a surface opposite to the front surface may be defined as a rear surface of the electronic device 200. In addition, a surface surrounding a space between the front surface and the rear surface may be defined as a side surface of the electronic device 200.

The foldable housing 201 may include a first housing structure 210, a second housing structure 220 including a sensor area 222, a first rear surface cover 215, a second rear surface cover 225, and a hinge structure 230. The hinge structure 230 may include a hinge cover that covers a foldable portion of the foldable housing 201. However, the foldable housing 201 of the electronic device 200 is not limited to the shape and connection illustrated in FIGS. 2 and 3, but may be implemented to have another shape or through a combination and/or connection of components or parts. For example, the first housing structure 210 and the first rear surface cover 215 may be integrated, and the second housing structure 220 and the second rear surface cover 225 may be integrated.

The first housing structure 210 may be connected to the hinge structure 230 and may include a first surface facing a first direction and a second surface facing a second direction opposite to the first direction. The second housing structure 220 may be connected to the hinge structure 230 and may include a third surface facing a third direction and a fourth surface facing a fourth direction opposite to the third direction. The second housing structure 220 may rotate with respect to the first housing structure 210 about the hinge structure 230. A state of the electronic device 200 may be changed to a folded state or an unfolded state.

The first surface and the third surface may meet when the electronic device 200 is in a fully folded state (e.g., a state in which the electronic device 200 is fully folded), and the third direction and the first direction are the same when the electronic device 200 is in a fully unfolded state (e.g., a state in which the electronic device 200 is fully unfolded).

The first housing structure 210 and the second housing structure 220 may be disposed on both sides with respect to a folding axis A, and may be overall symmetrical with respect to the folding axis A. As to be described in greater detail below, an angle or distance between the first housing structure 210 and the second housing structure 220 may vary according to whether the state of the electronic device 200 is the unfolded state, the folded state, or a partially unfolded or folded state (or an intermediate state). Unlike the first housing structure 210, the second housing structure 220 may additionally include the sensor area 222 in which various sensors are disposed. However, apart from such an area, the first housing structure 210 and the second housing structure 220 may be symmetrical in other areas.

As illustrated in FIG. 2, the first housing structure 210 and the second housing structure 220 may together form a recess that accommodates therein the main display 250. Due to the sensor area 222, the recess may have at least two different widths in a direction perpendicular to the folding axis A. For example, the recess may have a first width w1 between a first portion 210a of the first housing structure 210 parallel to the folding axis A and a first portion 220a of the second housing structure 220 formed on a periphery of the sensor area 222, and a second width w2 formed by a second portion 210b of the first housing structure 210 and a second portion 220b of the second housing structure 220 that is not the sensor area 222 and is parallel to the folding axis A. In this example, the second width w2 may be greater than the first width w1. The first portion 220a and the second portion 220b of the second housing structure 220 may be at different distances from the folding axis A. However, the width of the recess is not limited to the example widths. For example, the recess may have a plurality of widths according to the shape of the sensor area 222 or an asymmetrical portion of the first housing structure 210 and the second housing structure 220. The sensor area 222 may be formed to have a predetermined area adjacent to one corner of the second housing structure 220. However, the arrangement, shape, and size of the sensor area 222 are not limited to the illustrated example. For another example, the sensor area 222 may be provided at another corner of the second housing structure 220 or in an area between an upper corner and a lower corner. Components embedded in the electronic device 200 to perform various functions may be exposed to the front surface of the electronic device 200 through the sensor area 222 or through one or more openings provided in the sensor area 222. The components may include various types of sensors. The sensors may include, for example, at least one of a front camera, a receiver, or a proximity sensor. According to other example embodiments, the sensor area 222 may not be included in the second housing structure 220 or may be formed at a position different from the illustrated position.

At least a portion of the first housing structure 210 and the second housing structure 220 may be formed of a metal material or non-metal material having rigidity of a selected magnitude to support the main display 250. The portion formed of the metal material may provide a ground plane for the electronic device 200, and may be electrically connected to a ground line formed on a printed circuit board (PCB) disposed inside the foldable housing 201.

The first rear surface cover 215 may be disposed on one side of the folding axis A on the rear surface of the electronic device 200, and may have, for example, a substantially rectangular periphery that is surrounded by the first housing structure 210. Similarly, the second rear surface cover 225 may be disposed on the other side of the folding axis A on the rear surface of the electronic device 200, and may have a periphery that is surrounded by the second housing structure 220.

The first rear surface cover 215 and the second rear surface cover 225 may be substantially symmetrical with respect to the folding axis A. However, the first rear surface cover 215 and the second rear surface cover 225 are not necessarily symmetrical, but the electronic device 200 may include a first rear surface cover and a second rear surface cover of various shapes. According to another example embodiment, the first rear surface cover 215 may be integrated with the first housing structure 210, and the second rear surface cover 225 may be integrated with the second housing structure 220.

The first rear surface cover 215, the second rear surface cover 225, the first housing structure 210, and the second housing structure 220 may form a space in which various components (e.g., a PCB or a battery) of the electronic device 200 are disposed. According to an example embodiment, one or more components may be disposed or visually exposed (e.g., visible) on the rear surface of the electronic device 200. For example, at least a portion of a sub-display may be visually exposed through a first rear area 216 of the first rear surface cover 215. According to another example embodiment, one or more components or sensors may be visually exposed through a second rear area 226 of the second rear surface cover 225. The sensors may include a proximity sensor and/or a rear camera.

A front camera exposed to the front surface of the electronic device 200 through one or more openings provided in the sensor area 222 or a rear camera exposed through the second rear area 226 of the second rear surface cover 225 may include one or more lenses, an image sensor, and/or an image signal processor (ISP). A flash may include, for example, a light-emitting diode (LED) or a xenon lamp. According to some example embodiments, two or more lenses (infrared (IR) camera, and wide-angle and telephoto lenses) and image sensors may be disposed on one surface of the electronic device 100.

Referring to FIG. 3, the hinge cover may be disposed between the first housing structure 210 and the second housing structure 220 to cover internal components (e.g., the hinge structure 230). The hinge structure 230 may be covered by a portion of the first housing structure 210 and the second housing structure 220, or may be exposed to the outside, according to the state of the electronic device 200 (e.g., the unfolded state, the intermediate state, or the folded state).

For example, when the electronic device 200 is in the unfolded state (e.g., the fully unfolded state) as illustrated in FIG. 2, the hinge structure 230 may be covered by the first housing structure 210 and the second housing structure 220 not to be exposed. For another example, when the electronic device 200 is in the folded state (e.g., the fully folded state) as illustrated in FIG. 3, the hinge structure 230 may be exposed to the outside, being between the first housing structure 210 and the second housing structure 220. For still another example, when the electronic device 200 is in the intermediate state with a certain angle formed between the first housing structure 210 and the second housing structure 220, the hinge structure 230 may be partially exposed to the outside, being between the first housing structure 210 and the second housing structure 220. In this example, an exposed area may be smaller than an area exposed in the fully folded state. The hinge structure 230 may include a curved surface.

The main display 250 may be disposed in a space formed by the foldable housing 201. For example, the main display 250 may be seated on the recess formed by the foldable housing 201 and be viewed from the outside through the front surface of the electronic device 200. For example, the main display 250 may form a most portion of the front surface of the electronic device 200. Accordingly, the front surface of the electronic device 200 may include the main display 250, and a partial area of the first housing structure 210 and a partial area of the second housing structure 220 that are adjacent to the main display 250. In addition, the rear surface of the electronic device 200 may include the first rear surface cover 215, a partial area of the first housing structure 210 adjacent to the first rear surface cover 215, the second rear surface cover 225, and a partial area of the second housing structure 220 adjacent to the second rear surface cover 225.

The main display 250 may be a display of which at least one area is deformable into a planar surface or a curved surface. According to an example embodiment, the main display 250 may provide a second display screen (e.g., a main screen) having a greater display area size than that of a first display screen, and the second display screen may include a folding area 253, a first area 251 disposed on one side of the folding area 253 (e.g., on the left side of the folding area 253 in FIG. 2), and a second area 252 disposed on the other side of the folding area 253 (e.g., on the right side of the folding area 253 in FIG. 2).

However, such an area division of the main display 250 as illustrated in FIG. 2 is provided merely as an example, and the main display 250 may be divided into a plurality of areas (e.g., two areas or four or more areas) according to a structure or functions thereof. For example, as illustrated in FIG. 2, the main display 250 may be divided into areas based on the folding area 203 extending in parallel to the folding axis A. For another example, the main display 250 may be divided into areas based on another folding axis (e.g., a folding axis parallel to the width direction of the electronic device 200).

The main display 250 may be combined with or disposed adjacent to a touch panel including a touch sensing circuit and a pressure sensor configured to measure the intensity (or pressure) of a touch. For example, for the touch panel, the main display 250 may be coupled to or disposed adjacent to the touch panel for detecting a stylus pen of an electromagnetic resonance (EMR) type.

The first area 251 and the second area 252 may be overall symmetrical with respect to the folding area 253. Unlike the first area 251, the second area 252 may include a notch cut according to the presence of the sensor area 222, but may be symmetrical to the first area 251 in the other areas except for such an area. That is, the first area 251 and the second area 252 may include mutually symmetrical portions and mutually asymmetrical portions.

The first area 251 and the second area 252 may each have an edge thickness different from an edge thickness of the folding area 253. The edge thickness of the folding area 253 may be less than the edge thickness of the first area 251 and the second area 252. For example, when cross-sectionally viewed, the first area 251 and the second area 252 may be asymmetrical in terms of thickness. For example, an edge of the first area 251 may be formed to have a first radius of curvature, and an edge of the second area 252 may be formed to have a second radius of curvature different from the first radius of curvature. For another example, when cross-sectionally viewed, the first area 251 and the second area 252 may be symmetrical in terms of thickness. The foregoing examples will be described in detail with reference to the accompanying drawings.

Hereinafter, each area of the main display 250 and operations of the first housing structure 210 and the second housing structure 220 will be described in relation to the state of the electronic device 200, for example, the folded state, the unfolded state, or the intermediate state.

When the electronic device 200 is in the unfolded state as illustrated in FIG. 2, the first housing structure 210 and the second housing structure 220 may be disposed to face the same direction with an angle of 180° formed therebetween. The surfaces of the first area 251 and the second area 252 of the main display 250 may form the angle of 180° and face the same direction (e.g., a direction of the front surface of the electronic device 200). The folding area 253 may form the same plane along with the first area 251 and the second area 252.

When the electronic device 200 is in the folded state as illustrated in FIG. 3, the first housing structure 210 and the second housing structure 220 may be disposed to face each other. The surfaces of the first area 251 and the second area 252 of the main display 250 may face each other with a narrow angle (e.g., an angle between 0° and 10°) formed therebetween. In this case, the folding area 253 may be formed to have a curved surface having a predetermined curvature, in at least a portion thereof.

When the electronic device 200 is in the intermediate state, the first housing structure 210 and the second housing structure 220 may be disposed with a certain angle therebetween. The surfaces of the first area 251 and the second area 252 of the main display 250 may form an angle that is greater than an angle formed therebetween in the folded state and less than an angle formed therebetween in the unfolded state. In this case, the folding area 253 may be formed to have a curved surface having a predetermined curvature, in at least a portion thereof. The curvature may be less than that formed in the folded state.

FIG. 4A is a perspective view of the electronic device 200 in a fully unfolded state, and FIG. 4B is a perspective view of the electronic device 200 in a partially unfolded state (or an intermediate state). As described above, a state of the electronic device 200 may be changed to a folded state or an unfolded state, for example. When viewed in a direction of a folding axis (e.g., an A axis in FIG. 2), the electronic device 200 may be folded in two manners—in-folding allowing the front surface of the electronic device 200 to form an acute angle and out-folding allowing the front surface of the electronic device 200 to form an obtuse angle. That is, the electronic device 200 of a foldable type may be classified into an in-folding type device that is folded through the in-folding and an out-folding type device that is folded through the out-folding. For example, when the electronic device 200 is in a state in which the electronic device 200 is folded through the in-folding, the first surface of the first housing structure 210 and the third surface of the second housing structure 220 may meet (or face) each other. When the electronic device 200 is a fully unfolded state, the first surface of the first housing structure 210 and the third surface of the second housing structure 220 may face the same direction (e.g., a direction parallel to a Z axis).

For example, when the electronic device 200 is in a state in which the electronic device 200 is folded through the out-folding, the second surface of the first housing structure 210 and the fourth surface of the second housing structure 220 may meet (or face) each other.

In addition, although not illustrated, the electronic device 200 may include a plurality of hinge axes (e.g., two parallel hinge axes including the A axis in FIG. 2 and another axis parallel to the A axis). In this case, the electronic device 200 may be folded through multi-folding which is a combination of the in-folding and the out-folding.

An in-folding type described herein may indicate a state in which the main display 250 is not visible to the outside in a fully folded state, and an out-folding type described herein may indicate a state in which the main display 250 is visible to the outside in the fully folded state. FIG. 4B illustrates the electronic device 200 that is partially unfolded in the process of the in-folding, for example, in an intermediate state.

Although the state in which the electronic device 200 is folded through the in-folding will be mainly described hereinafter as an example, the following description may also be applicable to the state in which the electronic device 200 is folded through the out-folding. Also, the main display 250 will be described mainly as a foldable display, but examples of which are not limited thereto. For example, the main display 250 may be a flexible display of various form factors and be implemented as a rollable display, for example.

Figure 5:
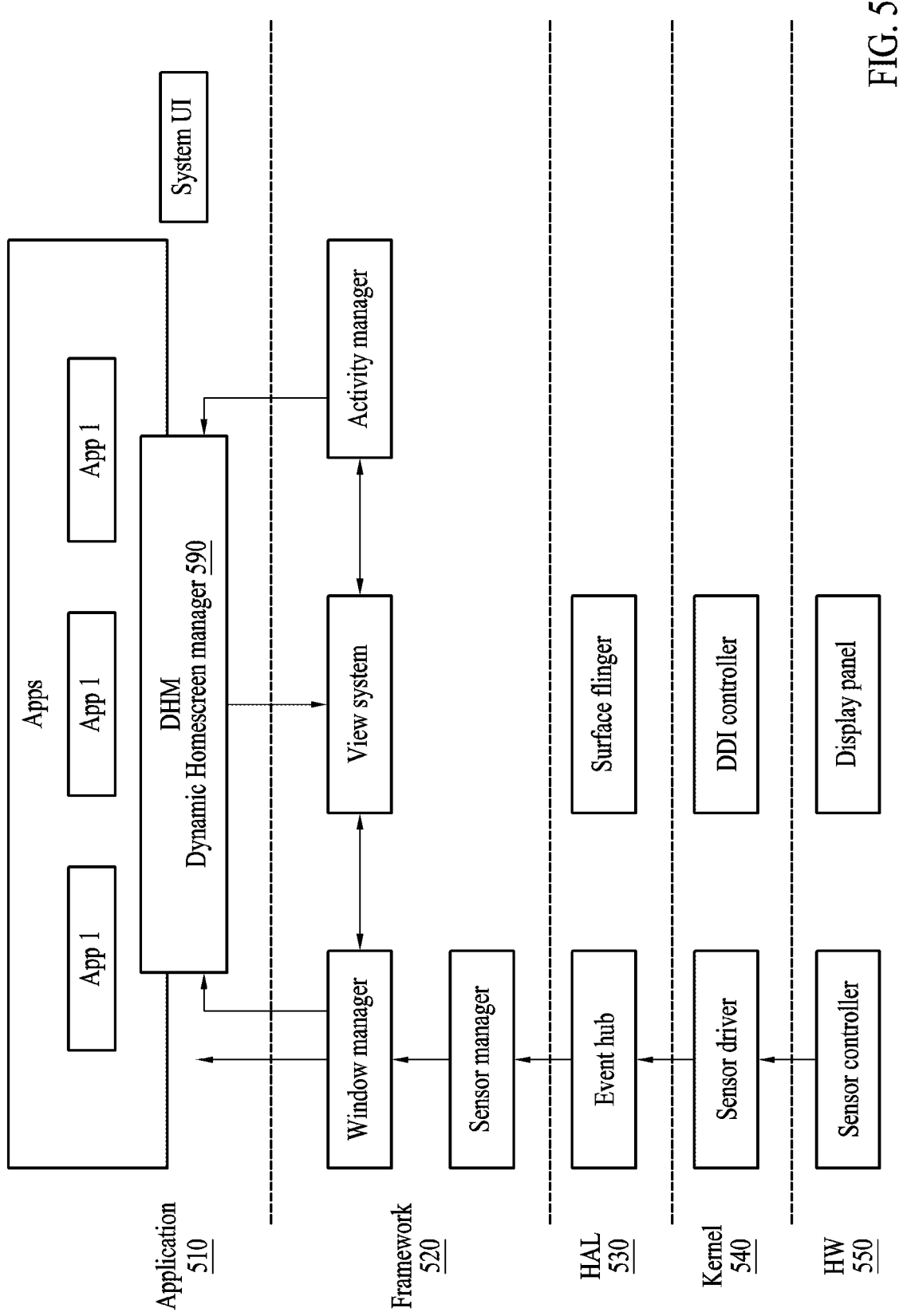
FIG. 5 is a diagram illustrating an example of a dynamic homescreen manager (DHM) state according to various embodiments.

FIG. 5 is a diagram illustrating an example of a dynamic homescreen manager (DHM) state according to various example embodiments.

According to various example embodiments, a system may include an application layer 510, a framework layer 520, a hardware abstraction layer (HAL) 530, a kernel layer 540, and a hardware layer 550. However, the illustrated structure is provided as an example, and at least some of the illustrated components may be changed according to a platform included in an electronic device.

The application layer 510 may include an application (or app). The application may draw at least one layer based on a resolution of a first display screen and/or a second display screen of a display. According to an example embodiment, the application may draw at least one layer based on the resolution of the first display screen and/or the second display screen of the display, using a drawing library (e.g., a view). For example, a display module of a folded electronic device (e.g., the electronic device 101 of FIG. 1) may provide the first display screen, and the folded electronic device may output (e.g., draw) a layout (e.g., a page layout and/or a view layout to be described in greater detail below) based on the resolution of the first display screen. For another example, a display module of an unfolded electronic device may provide the second display screen, and the unfolded electronic device may output a layout based on the resolution of the second display screen.

The framework layer 520 may include a window manager, a view system, an activity manager, and a sensor manager. When a change in a state of the electronic device (e.g., screen expansion by unfolding or screen reduction by folding) is identified through a sensor module, the window manager may transmit information of a display screen corresponding to the changed state of the electronic device to the application. For example, when the change in the state of the electronic device is identified, the information of the display screen corresponding to the changed state of the electronic device may be transmitted to an application to which continuity is set among applications that are being executed. The view system may refer to a program that draws at least one layer based on a resolution of the display screen (e.g., the first display screen and/or the second display screen) of the display module. The application may use the view system to output (e.g., draw) a view layout including two or more page layouts based on the resolution of the second display screen of the display module. The sensor manager may refer to a software module that controls an application of a sensor. The activity manager may monitor an activity of the application. The activity manager may update configuration information of each application by transmitting an event related to a device state change (e.g., a display change and a horizontal-vertical switch) to a DHM 590.

The HAL 530 may be a layer abstracted between a plurality of hardware modules included in the hardware layer 550 and software of the electronic device. The HAL 530 may include an event hub and a surface flinger. The event hub may refer to an interface module that standardizes events occurring in a touch module and the sensor module. The surface flinger may combine a plurality of layers. The surface flinger may provide data representing the combined layers to a display controller.

The kernel layer 540 may include various drivers for controlling various hardware modules included in the electronic device. The kernel layer 540 may include a sensor driver and a display driver integrated circuit (IC) (DDI) controller. The sensor driver may include an interface module that controls a sensor controller connected to the sensor. The DDI controller may control a display driver circuit of a display panel.

The hardware layer 550 may include the sensor controller and the display panel. The sensor controller may identify a state change of the electronic device based on the sensor module. The display panel may provide the first display screen and/or second display screen described above.

The application layer 510 may include the DHM 590. The DHM 590 may be in a homescreen, and may thus be in the application layer 510. In addition, the DHM 590 may be connected to the activity manager in a structure that changes a screen state from a first region to an nth region (e.g., n denotes an integer greater than or equal to 1) according to an activity configuration change, and may be represented as a view system. A processor of the electronic device may operate the DHM 590 to dynamically synchronize an item arrangement for each area size of display screens and provide the synchronized item arrangement.

When a state of the electronic device is changed from the folded state to the unfolded state, the electronic device may output a cover screen on one (e.g., one of a left region and a right region) of a plurality of regions of a main screen. The electronic device may set a reference page layout as a reference based on a display screen before a display expansion and apply the reference page layout to a display screen after the display expansion, thereby providing a consistent user experience. For example, the electronic device may set the reference page layout based on a first display screen having a default display area, and may output the reference page layout on a first region of a second display screen having an expanded display area after the expansion (e.g., unfolding) and output another page layout grouped together with the reference page layout on a second region of the second display screen. The reference page layout and the other page layout may be provided with the same grid configuration. The electronic device may thus provide a dynamic and consistent screen switch in the expanded display module. The reference page layout may be determined to be a page layout output on the first display screen (e.g., the cover screen) or another target page layout at a time (e.g., an expansion time) at which the expansion is detected.

For example, a grid configuration may refer to a configuration of an arrangement of spaces in which view components including icons, folders, and application widgets are arranged on a screen. An example of the grid configuration will be described in greater detail below with reference to FIGS. 19A, 19B and 19C.

The electronic device may provide a continuous screen before and after a display expansion by synchronizing a homescreen in a multi-display environment. Even though a displayable layout is different depending on the size of each display, the electronic device may provide a consistent screen. The electronic device may provide the consistent screen by expanding a reference page at the expansion, and synchronize items on the cover screen and the main screen to provide the synchronized items. The electronic device may thereby improve consistency in user experience.

Figure 6:
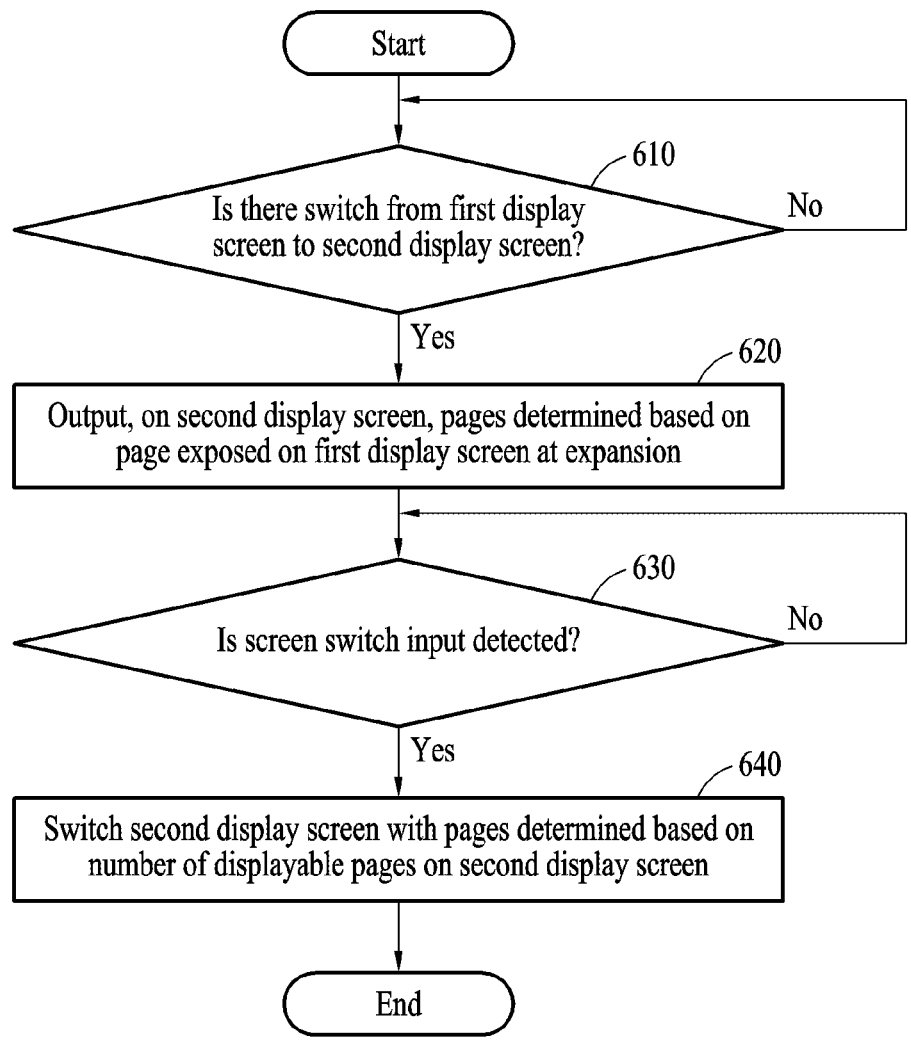
FIG. 6 is a flowchart illustrating an example method of operating an electronic device having a variable display area according to various embodiments.

FIG. 6 is a flowchart illustrating an example method of operating an electronic device having a variable display area according to various embodiments.

In operation 610, an electronic device (e.g., the electronic device 101 of FIG. 1) may monitor whether there is a screen switch from a first display screen to a second display screen. For example, the electronic device may detect a screen expansion of a display module. The display module may switch from the first display screen to the second display screen having a greater display area than the first display screen. It will be mainly described herein with an example of an electronic device having a foldable form factor in which the first display screen is an external sub-screen (e.g., a cover screen) and the second display screen is an internal main screen. However, examples are not limited thereto. For example, in the case of an electronic device having a rollable form factor, the first display screen may be a screen with an unrolled partial region of the display module, and the second display screen may be a screen additionally including an unrolled region in addition to the first display screen. The electronic device may output an individual page layout on the first display screen until there is the screen switch from the first display screen to the second display screen.

In operation 620, the electronic device may output, on the second display screen, pages determined based on a page exposed to the first display screen at the expansion. For example, when a screen of the display module is switched from the first display screen to the second display screen, the electronic device may output, on the second display screen, a first view layout including a page layout output on the first display screen and another page layout grouped together with the page layout output on the first display screen. For example, will be described hereinafter with reference to FIG. 8, grouped page layouts included in a view layout may be determined at activation of synchronization (refer to FIG. 17) between display screens. For another example, page layouts may be grouped based on the number of pages that are displayable on the second display screen.

In operation 630, the electronic device may detect a screen switch input. The electronic device may detect an input switching the screen from the first view layout to a second view layout. The second view layout may include at least one page layout and a neighboring page layout among page layouts included in the first view layout. For example, the electronic device may detect, as the screen switch input, an input (e.g., a swipe input and a drag input) of which a touch point formed on a display is released after moving a threshold distance or greater in a preset direction (e.g., a horizontal movement direction from left to right or from right to left). The detection of the screen switch input will be described in greater detail below with reference to FIGS. 14A and 14B. The electronic device may maintain the output of the first view layout including current page layouts until the screen switch input is detected.

In operation 640, the electronic device may switch the second display screen with the pages determined based on the number of pages displayable on the second display screen. For example, when the screen switch input to the display module is detected, the electronic device may switch the second display screen from the first view layout to the second view layout including a destination page layout determined based on the number of pages displayable on the second display screen. The determination of the destination page layout will be described in greater detail below with reference to FIG. 15.

Figure 7:
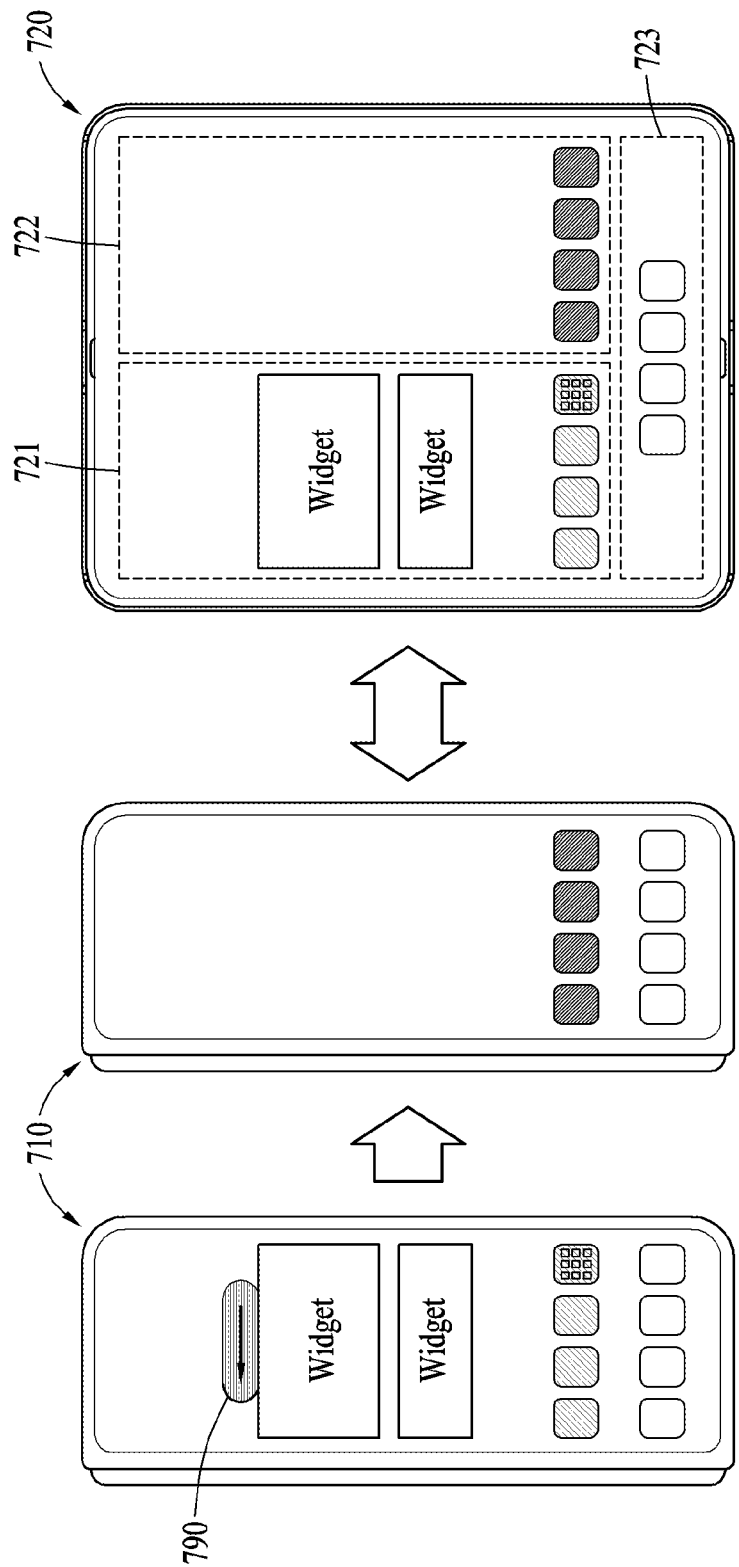
FIG. 7 is a diagram illustrating an example of outputting a page layout in response to an increase in a display area size according to various embodiments.

FIG. 7 is a diagram illustrating an example of outputting a page layout in response to an increase in a display area size according to various embodiments.

According to an example embodiment, an electronic device may output a first page layout on a first display screen 710. In the example of FIG. 7, the first page layout may include a widget item, an icon item, and a folder item. When a screen switch input 790 is detected, the electronic device may switch the first display screen 710 from the first page layout to a second page layout. The second page layout may be a neighboring page layout adjacent to the first page layout among a plurality of page layouts. In the example of FIG. 7, in response to an input swiping from right to left, the electronic device may switch the first display screen 710 with the second page layout that is subsequent to the first page layout. For example, when a page index of the first page layout is i, a page index of the second page layout may be i+1, in which i denotes an integer greater than or equal to 0, but examples are not limited thereto. For another example, in response to an input swiping from left to right, the electronic device may output a previous page layout (e.g., a page layout corresponding to a page index of i−1) before the first page layout.

For example, in the first display screen 710, an upper-end area may be classified as a page area, and a lower-end area may be classified as a hotseat area. In this example, in response to a screen switch input, the electronic device may switch a page layout only in the page area and maintain an item output displayed on the hotseat area. The hotseat area may be an area in which items set separately from the page area are arranged.

When a screen of a display module is switched from the first display screen 710 to a second display screen 720, the electronic device may output, on the second display screen 720, a first view layout including the first page layout and a second page layout grouped together with the first page layout. For example, the electronic device may output the first page layout on a first page area 721 among page areas of the second display screen 720, and output the second page layout on a second page area 722 among the page areas of the second display screen 720. Thus, the electronic device may provide more expanded information to a user as the screen is expanded, through a consistent user interface (UI).

In the example of FIG. 7, a display area size of the second display screen 720 is illustrated as being approximately double a display area size of the first display screen 710, and one page layout may be provided on the first display screen 710 and two grouped page layouts may be provided on the second display screen 720. However, examples are not limited thereto. For another example, the number of page layouts output on the second display screen 720 may be determined based on the number of page layouts provided on the first display screen 710 and a ratio of the display area size of the second display screen 720 to the display area size of the first display screen 710. For example, when the display area size of the second display screen 720 is greater than the display area size of the first display screen 710 by a factor of approximately m, the electronic device may output a view layout including grouped m page layouts on the second display screen 720. In this example, m denotes an integer greater than or equal to 2. The electronic device may also determine the number of page layouts displayable on the second display screen 720 based on at least one of an area ratio or a resolution ratio, in addition to the ratio between the display area sizes of the display screens. For example, when a resolution of the first display screen 710 is X×Y and a resolution of the second display screen 720 is (m·X)×(a·Y), the electronic device may output a view layout including grouped m page layouts on the second display screen 720. In this example, a denotes a real number exceeding 0.

The electronic device may provide an item of a hotseat area 723 of the second display screen 720 based on a hotseat area of the first display screen 710. For example, the electronic device may provide the same item as that of the first display screen 710 as the item of the hotseat area 723 of the second display screen 720, but examples are not limited thereto. Various methods of setting synchronization between a first display screen and a second display screen with respect to a hotseat area will be described in greater detail below with FIGS. 18A, 18B and 18C.

In the example of FIG. 7, a grid configuration for each page area of the second display screen 720 may be determined based on a grid configuration of the first display screen 710. For example, the electronic device may set the grid configuration for each page area of the second display screen 720 to be the same as or similar to the grid configuration of the first display screen 710. In this example, when a grid (e.g., a 4×5 grid) in which four items are arrangeable widthwise and five items are arrangeable lengthwise is set for the first display screen 710, the 4×5 grid may be individually set for the first page area 721 and the second page area 722 each. That is, an m times greater number of items than the number of items arrangeable on the first display screen 710 along a horizontal axis may be arranged on the second display screen 720. Thus, the electronic device may provide the same grid configuration of a cover screen to a main screen and may thereby provide a user with a more intuitive and consistent user experience.

In addition, at a screen expansion, the electronic device may output a page layout (e.g., a reference page layout) of the first display screen 710 on a reference page area of the second display screen 720. For example, in the example of FIG. 7, the electronic device may output, on a left area (e.g., the first page area 721) with respect to a folding axis, the first page layout output on the first display screen 710. As described above, the electronic device may output the second page layout grouped together with the first page layout on a right area (e.g., the second page area 722) with respect to the folding axis. However, the reference page area is not limited to the foregoing example, and another area (e.g., the second page area 722) may be set to be the reference page area.

Figure 8:
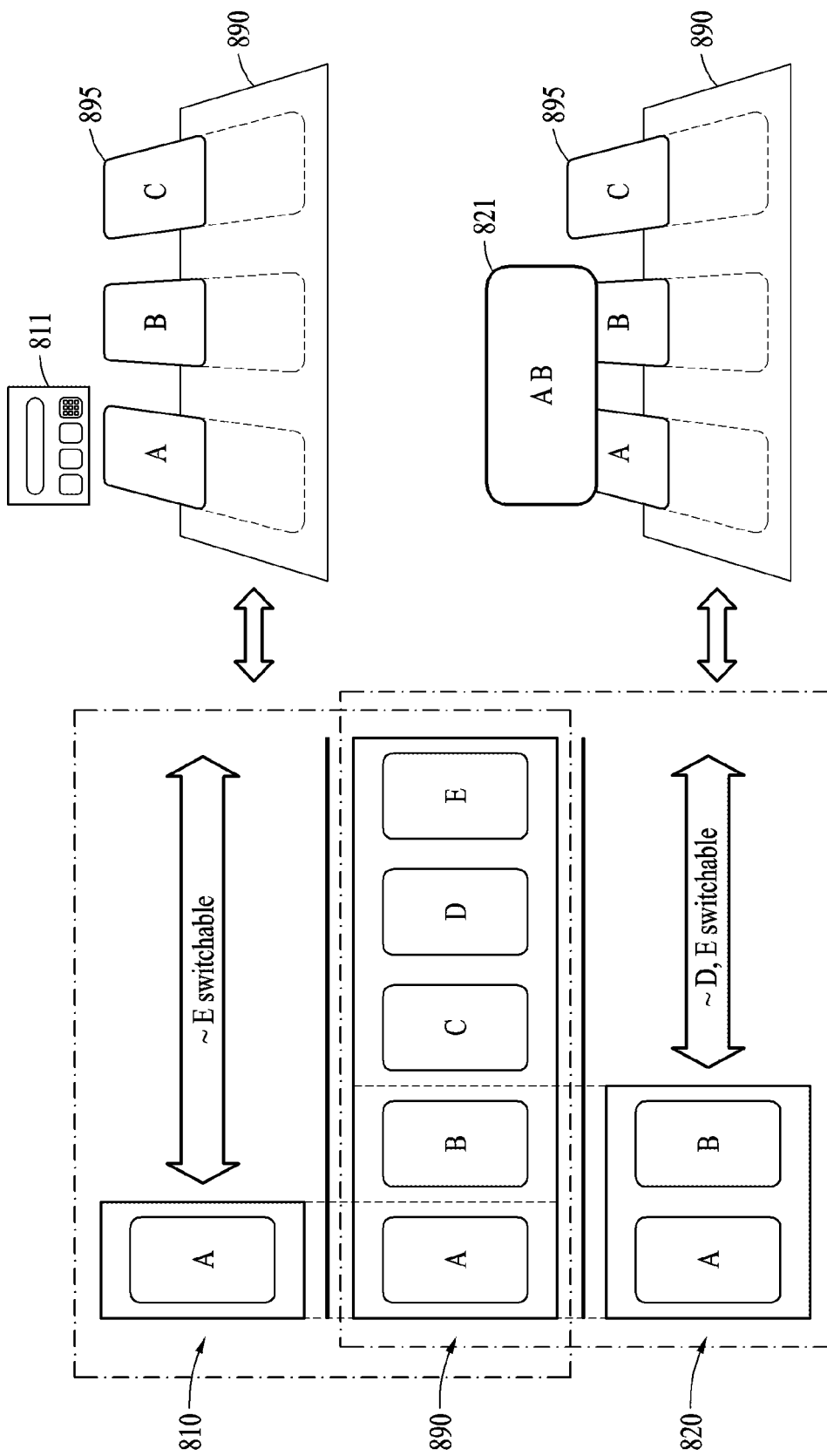
FIG. 8 is a diagram illustrating an example of outputting a page layout for each display area size in response to a screen switch according to various embodiments.

FIG. 8 is a diagram illustrating an example of outputting a page layout for each display area size in response to a screen switch according to various embodiments.

When setting synchronization between a first display screen 810 and a second display screen 820 and/or switching a screen from the first display screen 810 to the second display screen 820, an electronic device may group page layouts 895 based on the number of pages displayable on the second display screen 820.

A parent view 890 may refer to a view having one or more page layouts as a child view. A page layout may correspond to the child view of the parent view, and may indicate positions at which view components set by a user according to a grid set on a unit screen area are arranged. The unit screen area may be determined based on a display area and resolution of each display screen of a display module of the electronic device, and may represent herein an area that is determined based on the first display screen 810 before a screen expansion. As described above, the page layout may be output on the first display screen 810 and/or on a remaining area (e.g., page areas) excluding a hotseat area in the second display screen 820. A view component may correspond to an item that may be added to and/or removed from the page layout, for example, an icon, a folder, and an app widget. The icon and/or folder may be arranged on a hotseat area of a display screen (e.g., the first display screen 810 and/or the second display screen 820). That is, a layer corresponding to the page layouts 895 may be on a layer corresponding to the parent view 890, and the view components may be arranged on the layer corresponding to the page layouts 895.

A view layout may refer to a layout representing a view output on each display screen and may include one or more page layouts. For example, when the electronic device outputs a homescreen, the view layout may include a hotseat area along with the page layouts.

For example, as illustrated, the electronic device may provide a view layout 811 including a single page layout on the first display screen 810. The electronic device may output, on the first display screen 810, the view layout 811 including one (e.g., a page layout A) among the page layouts 895 (e.g., page layouts A through E) of the parent view 890. In response to a swipe input, the electronic device may switch the page layout to be output on the first display screen 810.

For another example, the electronic device may provide a view layout 821 including a plurality of page layouts (e.g., two page layouts) on the second display screen 820. For example, the electronic device may output, on the second display screen 820, the view layout 821 including a page layout A and a page layout B among the page layouts 895. In response to a swipe input, the electronic device may switch the page layouts output on the second display screen 820 based on the number of page layouts grouped into a view layout. In the example of FIG. 8, in response to a swipe input, the electronic device may switch the view layout 821 including the page layouts A and B to a view layout including page layouts C and D.

For example, an item arrangement in a page layout output on each page area of the second display screen 820 may be the same as or similar to that of the first display screen 810. The electronic device may adjust a page layout included in a corresponding view layout and/or an item size based on the display area size of the second display screen 820. The electronic device may adjust a layout size to fit the display area size.

Figure 9:
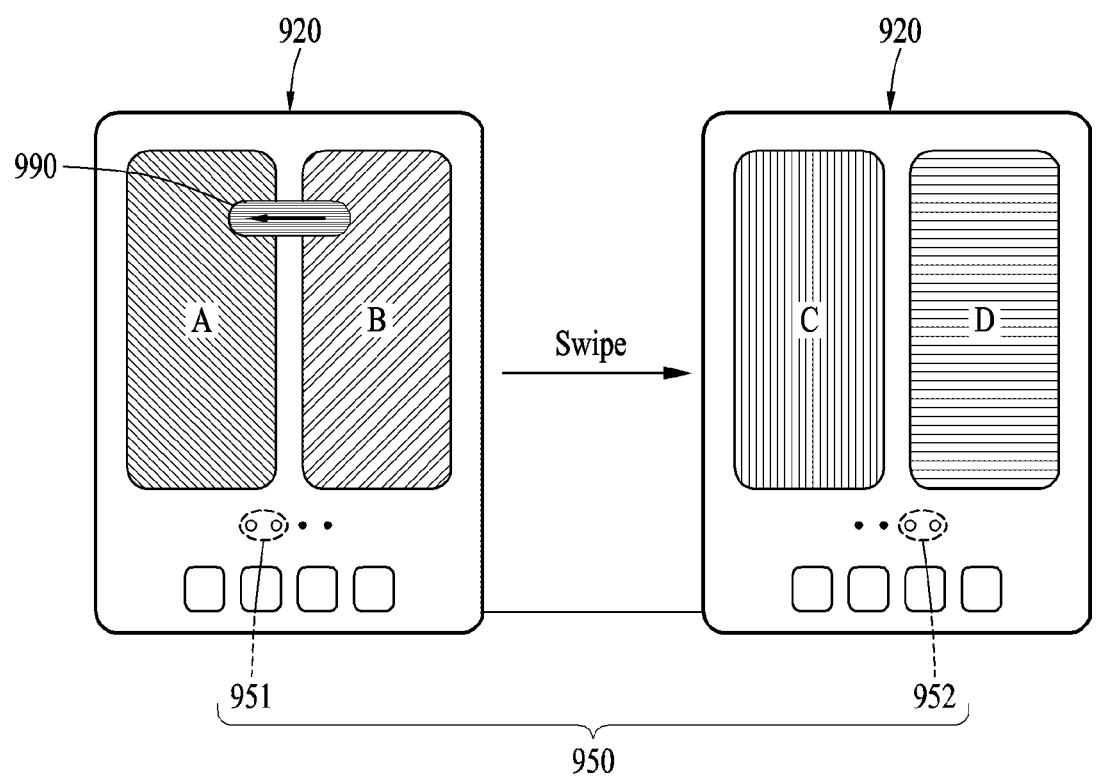
FIG. 9 is a diagram illustrating an example of providing indicators for page layouts according to various embodiments.

FIG. 9 is a diagram illustrating an example of providing indicators for page layouts according to various embodiments.

According to an example embodiment, an electronic device (e.g., the electronic device 101 of FIG. 1) may visualize grouping of indicators 950 included in the same view layout. The electronic device may output an indicator indicating a page layout and another indicator indicating another page layout as a graphic representation different from that for other indicators. For example, as illustrated in FIG. 9, while outputting, on a second display screen 920, a first view layout including page layouts A and B, the electronic device may output indicators 951 indicating the page layouts included in the first view layout as a graphic representation different from that for another indicator. The electronic device may change at least one of or a combination of at least two of a shape, a color, a size, and a spacing of the indicators 951 to be different from that for other remaining indicators. For example, the electronic device may adjust a spacing between an indicator indicating a page layout and another indicator indicating another page layout to be different from a spacing between other indicators. The electronic device may adjust a spacing between the indicators 950 indicating the page layouts included in the same view layout to be smaller than a spacing between the other remaining indicators.

In response to a screen switch input 990, the electronic device may switch the second display screen 920 from the first view layout to a second view layout different from the first view layout. For example, the electronic device may output the second view layout including a page layout (e.g., a page layout C) (which is adjacent to a page layout (e.g., a page layout B) included in the first view layout) and a page layout D. The electronic device may visualize indicators 952 indicating grouped page layouts in the second view layout to be different from other indicators in terms of at least one of or a combination of at least two of a shape, a color, a size, and a spacing. Before detecting the screen switch input 990, the electronic device may restore indicators indicating page layouts included in the first view layout to a default graphic representation, and change a graphic representation of indicators indicating page layouts included in the second view layout.

For example, a difference between an index corresponding to a reference page of a first view layout before a screen switch input is detected and an index corresponding to a reference page of a second view layout after the screen switch input is detected may correspond to the number of pages displayable on a second display screen. In the example of FIG. 9, the number of pages displayable on the second display screen is two, an index corresponding to a page layout A which is a reference page of a first view layout is 0, and an index corresponding to a page layout C which is a reference page of a second view layout is 2. In this example, indices indicating layouts A, B, C, D, and E may be 0, 1, 2, 3, and 4, respectively, in sequential order. A difference between the index 0 corresponding to the page layout A and the index 2 corresponding to the page layout C may be two which is the number of pages displayable on the second display screen.

The electronic device may visualize, as the same graphic representation, indicators indicating page layouts grouped into the same view layout and provide the visualized graphic representation different from that for remaining indicators, thereby intuitively providing an order of page layouts included in a view layout currently output on the second display screen.

Figure 10A:
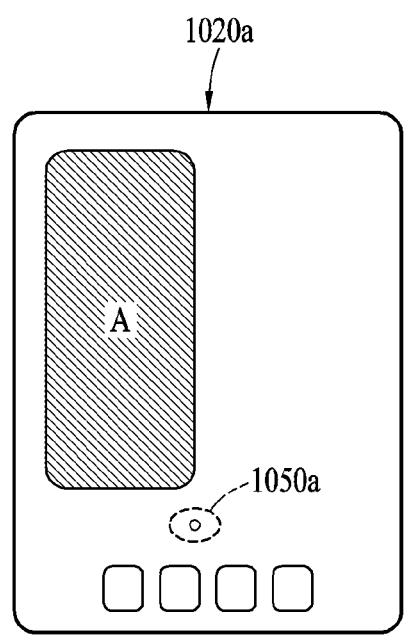
FIGS. 10A and 10B are diagrams illustrating an example of outputting and switching a view layout according to various embodiments.
Figure 10B:
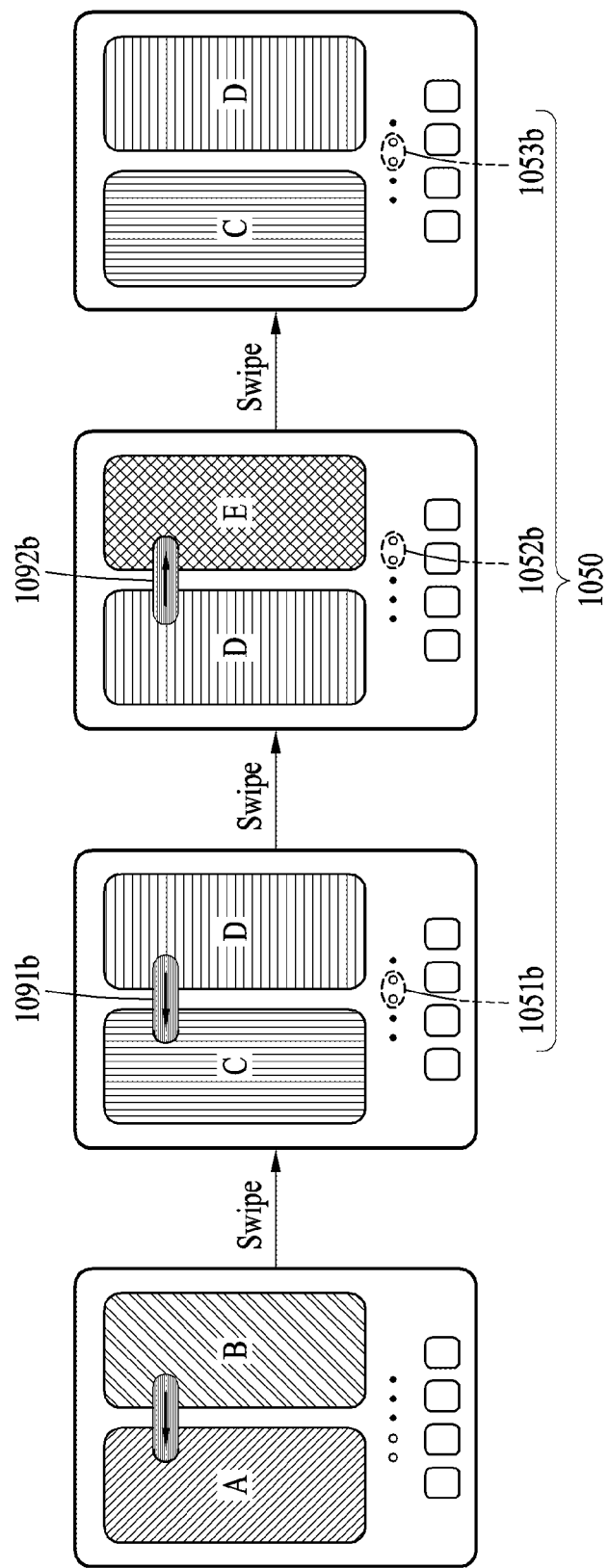

FIGS. 10A and 10B are diagrams illustrating an example of outputting and switching a view layout according to various embodiments.

An output on a second display screen may vary according to the number of page layouts included in a parent view. For example, when there is no remainder obtained by dividing the total number of page layouts by the number of pages displayable on the second display screen, an electronic device (e.g., the electronic device 101 of FIG. 1) may switch a screen from page layouts grouped into the same view layout to page layouts grouped into another view layout in response to a screen switch input, as described above with reference to FIG. 9. An operation performed when there is a remainder obtained by dividing the total number of page layouts by the number of pages displayable on the second display screen will be described hereinafter.

FIG. 10A illustrates an example where the total number of page layouts is one. The electronic device may output a view layout including a single page layout on a second display screen 1020a. The electronic device may also output a single indicator 1050a corresponding to the single page layout. In the example of FIG. 10A, a reference page area is illustrated as a first page area (e.g., a left area with respect to a folding axis) and a page layout A is illustrated as being output on the first page area, but examples are not limited thereto. According to a configuration, the electronic device may set the reference page area as a second page area (e.g., a right area with respect to the folding axis) and output the page layout A on the second page area. The electronic device may maintain another page area that is not the reference page area to be empty. In addition, since there is no page layout to be switched, the electronic device may ignore a screen switch input. Although the example where the number of pages displayable on the second display screen is two is mainly described with reference to FIG. 10A, examples are not limited thereto. For example, even when the number of pages displayable on the second display screen is n and the total number of pages is n−1, the foregoing description may be applicable in a similar way.

FIG. 10B illustrates an example where the total number of page layouts is five and the number of pages displayable on a second display screen is two. When detecting a screen switch input 1091b while outputting page layouts C and D, the electronic device may output page layouts D and E. For example, when at least one of page layouts requested in response to a screen switch input being detected exceeds an available range, the electronic device may limit, to the available range, an end page layout among a plurality of page layouts included in a second view layout. In the example of FIG. 10B, when a screen switch input is detected in a view layout including the page layouts C and D, a screen may be supposed to be switched to page layouts E and F. However, the page layout F may not be present. That is, the requested page layout F may exceed the available range. In this case, the electronic device may determine the page layout E to be the end page layout. That is, a last page layout (e.g., the page layout E) among a plurality of page layouts may be output along with at least one page layout (e.g., the page layout D) that is previously included in a view layout before a screen switch.

When detecting a screen switch input 1092b made in an opposite direction while outputting the view layout including the end page layout, the electronic device may restore a previous reference page layout. For example, when detecting the screen switch input 1092b in the opposite direction while outputting the page layouts D and E, the electronic device may switch the screen to the page layouts C and D instead of outputting the page layout B. The electronic device may set reference pages among page layouts based on the number of pages displayable on the second display screen. When a requested page layout does not exceed the available range, the electronic device may switch a view layout from a reference page to another reference page at a screen switch. In the example of FIG. 10B, the page layouts A, C, and E may be set as reference pages. Thus, the electronic device may provide a consistent user experience through a view layout in which remaining page layouts are grouped excluding the end page layout.

As described above, the electronic device may output indicators 1050 grouped into a corresponding view layout of individual view layouts as the same graphic representation. For example, in a view layout including the page layouts C and D, indicators 1051*b* and 1053*b* indicating the page layouts C and D may be output as the same graphic representation. In addition, in a view layout including the page layouts D and E, indicators 1052*b* indicating the page layouts D and E may be output as the same graphic representation.

Thus, the electronic device may switch and output page layouts such that all page areas of the second display screen are filled even when the number of pages displayable on the second display screen and the total number of pages are relatively prime. However, examples are not limited thereto, but may vary according to user settings.

Figure 11:
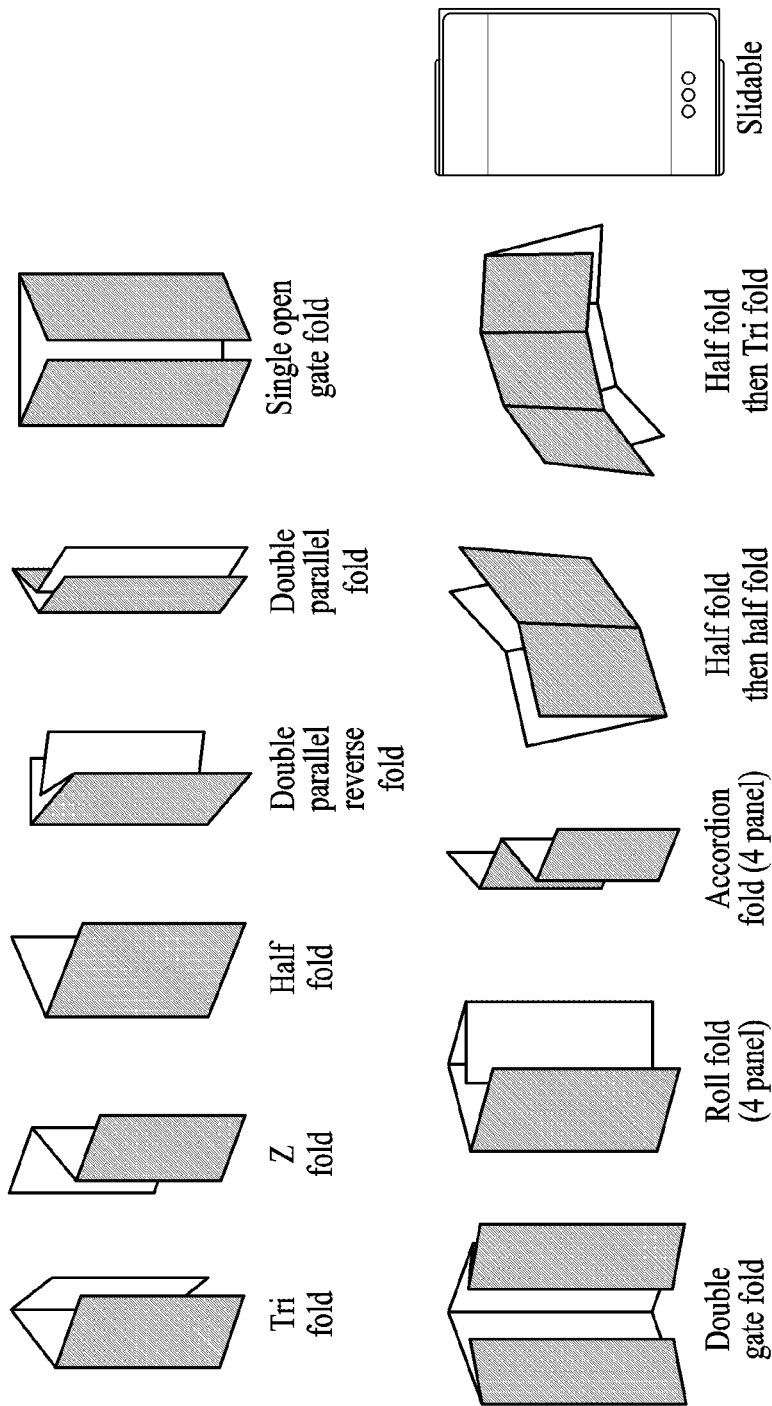
FIG. 11 is a diagram illustrating examples of a form factor of a display module according to various embodiments.

FIG. 11 is a diagram illustrating examples of various form factors of a display module according to various embodiments.

According to an example embodiment, a form factor of a display module of an electronic device (e.g., the electronic device 101 of FIG. 1) may be configured in various ways as illustrated in FIG. 11. The display module of the electronic device may include one or more flexible displays that are foldable with respect to one folding axis or two or more folding axes. Also, the display module of the electronic device may be provided as a rollable and/or slidable display, and a screen may thereby be expandable.

Figure 12:
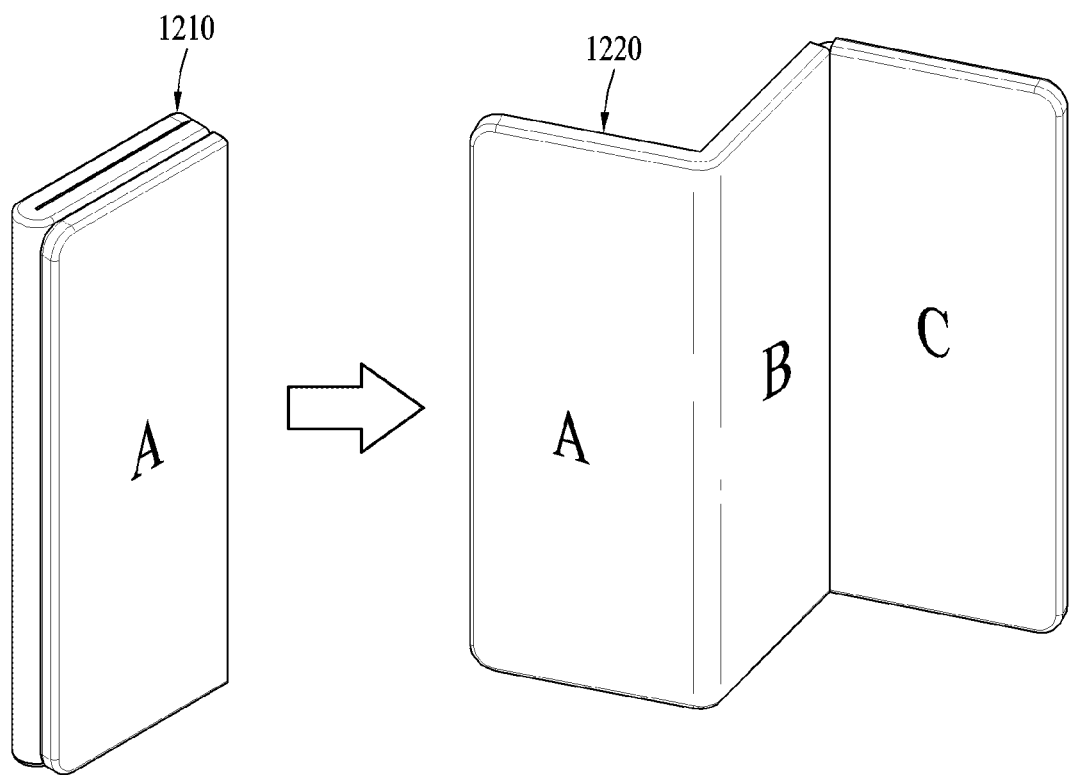
FIG. 12 is a diagram illustrating an example of providing a view layout on a Z-fold display module according to various embodiments.

FIG. 12 is a diagram illustrating an example of providing a view layout on a Z-fold display module according to various embodiments.

For example, a Z-fold display module may have an out-folding axis and an in-folding axis, and a screen split into three areas. In this example, an electronic device may output a page layout A on a cover screen 1210, output the page layout A and page layouts B and C on a main screen 1220.

Figure 13:
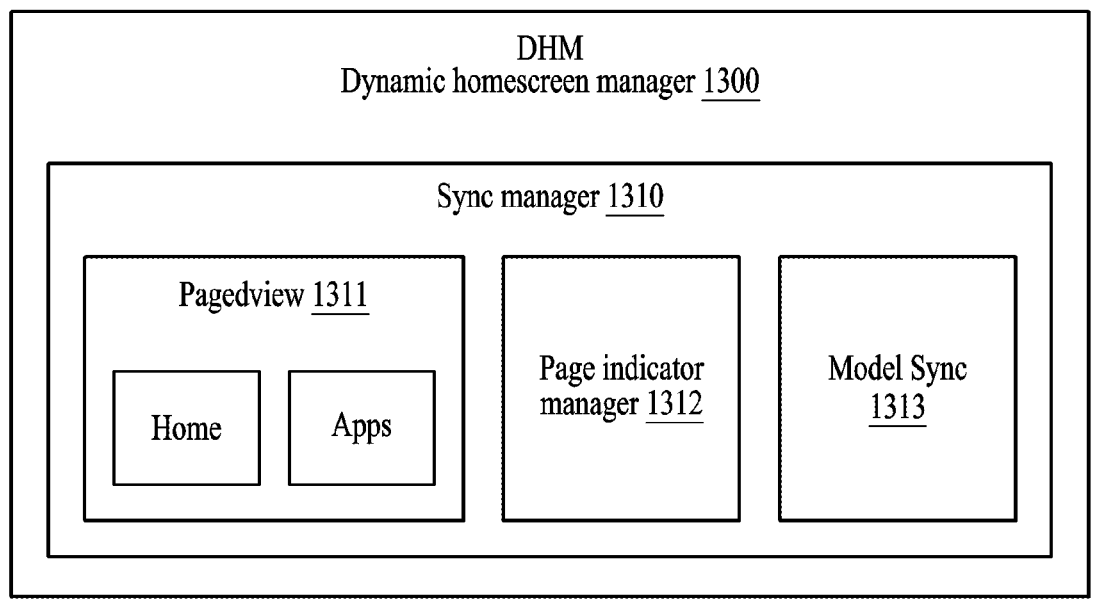
FIG. 13 is a block diagram illustrating an example configuration of a dynamic homescreen manager (DHM) according to various embodiments.

FIG. 13 is a block diagram illustrating an example configuration of a DHM according to various embodiments.

A DHM 1300 (e.g., the DHM 590 of FIG. 5) may include a sync manager 1310 including a paged view module 1311, a page indicator manger 1312, and a model sync module 1313, each of which may include various processing circuitry and/or executable program instructions.

The paged view module 1311 may represent a page layout to an extent as defined on each display screen. For example, the paged view module 1311 may adjust a width of a page layout and a spacing between page layouts. In response to a flick input (e.g., a short swipe input) and a drag input (e.g., a long swipe input), the paged view module 1311 may provide a single page layout and/or a switch between a plurality of page layouts. The paged view module 1311 may also provide a homescreen and an application screen. In response to the drag input, an electronic device may provide a user with a hint of a neighboring page layout by overlaying and outputting, in an existing page layout, at least a portion of the neighboring page layout corresponding to a dragging direction while maintaining a currently output page layout. The electronic device may determine an initial grid configuration of a second display screen to be the same as or similar to a grid configuration of a first display screen. The electronic device may provide page layout editing (e.g., adding a page layout, changing an order, etc.) on the homescreen. For example, when the order of the page layouts is changed, an index indicating each of the page layouts may also be changed. In addition, the electronic device may determine a reference page area among a plurality of page areas of the second display screen based on a user input. An example where a left area is a reference page area is mainly described herein.

The page indicator manager 1312 may manage page indicators indicating page layouts output on the first display screen and/or the second display screen. The page indicators may represent an order in which the page layouts are displayed. As described above, the electronic device may output as many indicators grouped in a view layout as the number of page layouts displayable on the second display screen. In addition, the electronic device may adjust a spacing between corresponding indicators of grouped page layouts. For example, the electronic device may set a spacing between grouped indicators to be smaller than a spacing between remaining indicators.

The model sync module 1313 may manage configuration data of each page layout. The electronic device may load configuration data of the first display screen at a screen switch and bind it with configuration data of the second display screen. That is, the electronic device may determine a grid configuration of the first display screen to be the same as or similar to a grid configuration of the second display screen. The electronic device may read indices of corresponding page layouts based on the number of pages displayable on the second display screen at a screen expansion. When activating or inactivating synchronization between the first display screen and the second display screen, the electronic device may generate, delete, and/or load configuration data of each display screen.

Figure 14A:
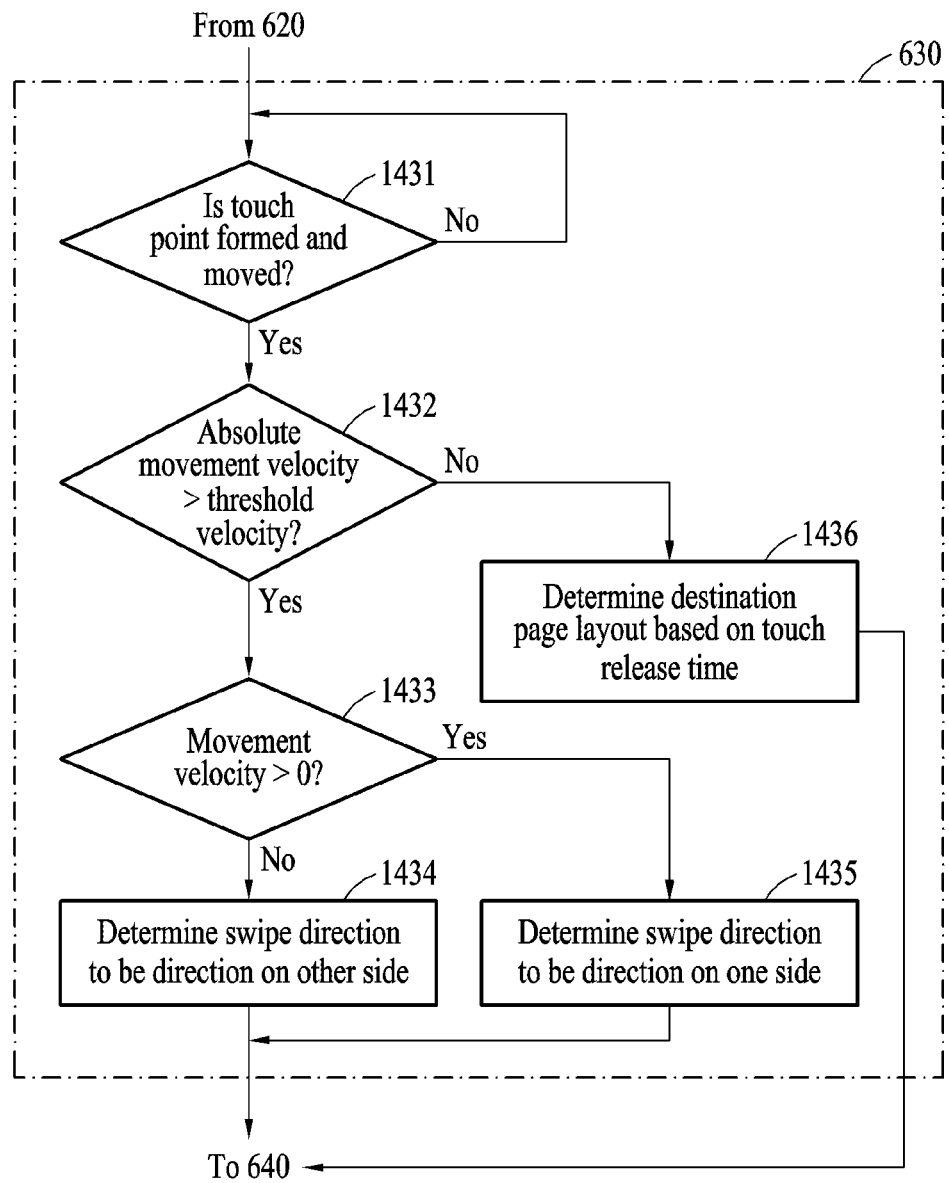
FIGS. 14A and 14B include a flowchart and a signal flow diagram illustrating an example operation of detecting a screen switch input according to various embodiments.
Figure 14B:
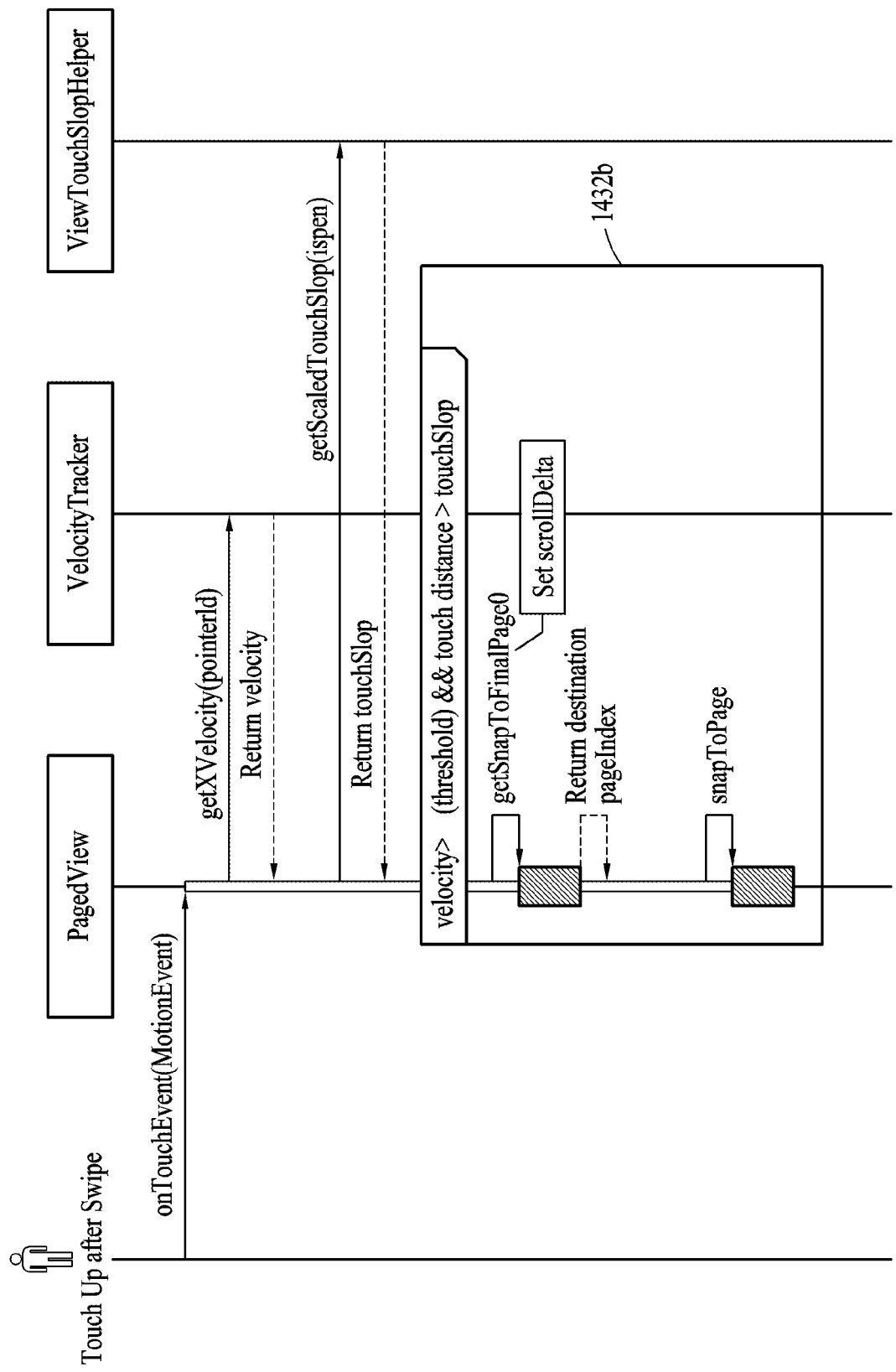

FIGS. 14A and 14B are diagrams including a flowchart and a signal flow diagram illustrating an example of detecting a screen switch input according to various embodiments.

FIG. 14A is a flowchart illustrating an example of operations performed to detect a screen switch input according to various embodiments.

In operation 1431, an electronic device may detect that a touch point is formed and moves. For example, the electronic device may determine whether a touch by an object of a user (e.g., a body part including a finger, a pen tip, etc.) is formed on a display while one of a first display screen and a second display screen of a display module is being displayed. The electronic device may determine that the touch is formed when the display and the object of the user are in contact or near each other. The electronic device may determine whether the touch point moves, with the touch point formed. The electronic device may wait for a touch input until the touch point is formed.

In operation 1432, the electronic device may determine whether an absolute movement velocity of the touch point exceeds a threshold velocity. When a movement velocity of a screen switch input exceeds a threshold velocity, the electronic device may determine a destination page layout corresponding to a movement direction of the screen switch input. When the movement velocity of the touch point is less than or equal to the threshold velocity, the movement of the touch point may be determined to be a maloperation. When the movement velocity of the touch point exceeds the threshold velocity, the movement of the touch point may be determined to be a flick input, a swipe input, and/or a drag input. The flick input, the swipe input, and/or the drag input may be identified based on the movement velocity, the movement direction, and/or a movement distance of the touch input.

In operation 1433, when the movement velocity of the touch point exceeds the threshold velocity, the electronic device may determine whether the movement velocity exceeds 0. For example, the electronic device may determine the movement direction of the touch point. In operation 1435, when the movement velocity exceeds 0, the electronic device may determine a swipe direction to be a direction toward one side (e.g., a direction from left to right). For example, when the movement velocity of the touch point exceeds 0, the electronic device may set ScrollDelta to be +1, in which ScrollDelta indicates a variable used to determine an index for switching a reference page. In operation 1434, when the movement velocity is less than 0, the electronic device may determine the swipe direction to be a direction toward the other side (e.g., a direction from right to left). For example, when the movement velocity of the touch point is less than 0, the electronic device may set ScrollDelta to be −1. That is, when detecting a fast swipe input, the electronic device may determine the detected input to be an input switching a currently outputting view layout, and switch a current view layout to a view layout including a previous page layout or a subsequent page layout of a page layout included in the current view layout, based on the swipe direction.

In operation 1436, when the movement velocity of the touch point is less than or equal to the threshold velocity, the electronic device may determine a destination page layout based on a touch release point. For example, when a neighboring page layout is exposed to a display screen by a threshold area size (e.g., half) or greater by a slow swipe input, the electronic device may determine the destination page layout to be the neighboring page layout. For another example, when the neighboring page layout is exposed to the display screen by a size less than the threshold area size (e.g., half) despite the slow swipe input, the electronic device may determine the destination page layout to be a reference page layout currently output on the current display screen. That is, the electronic device may suspend outputting the neighboring page layout that is partially exposed to the display screen, and restore the output of the current reference page layout.

FIG. 14B is a signal flow diagram illustrating an example function call process corresponding to the flow of FIG. 14A according to various embodiments.

The electronic device may detect that a touch point formed by a user is swiped and then touched up. A touch-up described herein may represent that a distance between an object of the user and a display increases, and may also refer to a release of the touch point. PagedView may represent an Android application programming interface (API) that processes an output and switch of page layouts as described above. In the example of FIG. 14B, PagedView, VelocityTracker, and ViewTouchSlopHelper may be Android APIs.

The electronic device may obtain coordinates of points on the display from a touch-down (e.g., formation of a touch) to a touch-up (e.g., release of the touch) through a function onTouchEvent(MotionEvent). The electronic device may request VelocityTracker for a movement velocity of a swipe input through a function getXVelocity(pointerId), and obtain a movement velocity returned from VelocityTracker.

In ViewTouchSlopHelper, the electronic device may identify whether the object of the user used for the touch swipe is a finger or a pen through a function getScaledTouchSlop (isPen), and obtain touchSlop. touchSlop may refer to a minimum movement distance for filtering a manipulation error other than an intended swipe, and different values may be set for a movement of a touch point by a finger and a movement of a touch point by a pen.

In operation 1432b, when the movement velocity of the touch point exceeds the threshold velocity and the movement distance of the touch exceeds the minimum movement distance, the electronic device may perform a page switch. As described above in relation to operations 1434 and 1435, the electronic device may set ScrollDelta to be +1 or −1 according to the movement direction. For example, the electronic device may determine a destination page index (destination pageIndex) indicating a destination page layout of a neighboring page layout (e.g., a previous page layout or a subsequent page layout), and switch to a corresponding to page through a function snapToPage. When the movement velocity is equal to or less than the threshold velocity or the movement distance of the touch is less than or equal to the minimum movement distance, the electronic device may output a closest page layout scrolled up to a corresponding point in time, in a similar way to what has been described above in relation to operation 1436. For example, FIG. 15 is a flowchart corresponding to the function, getSnapToFinalPage( ).

Figure 15:
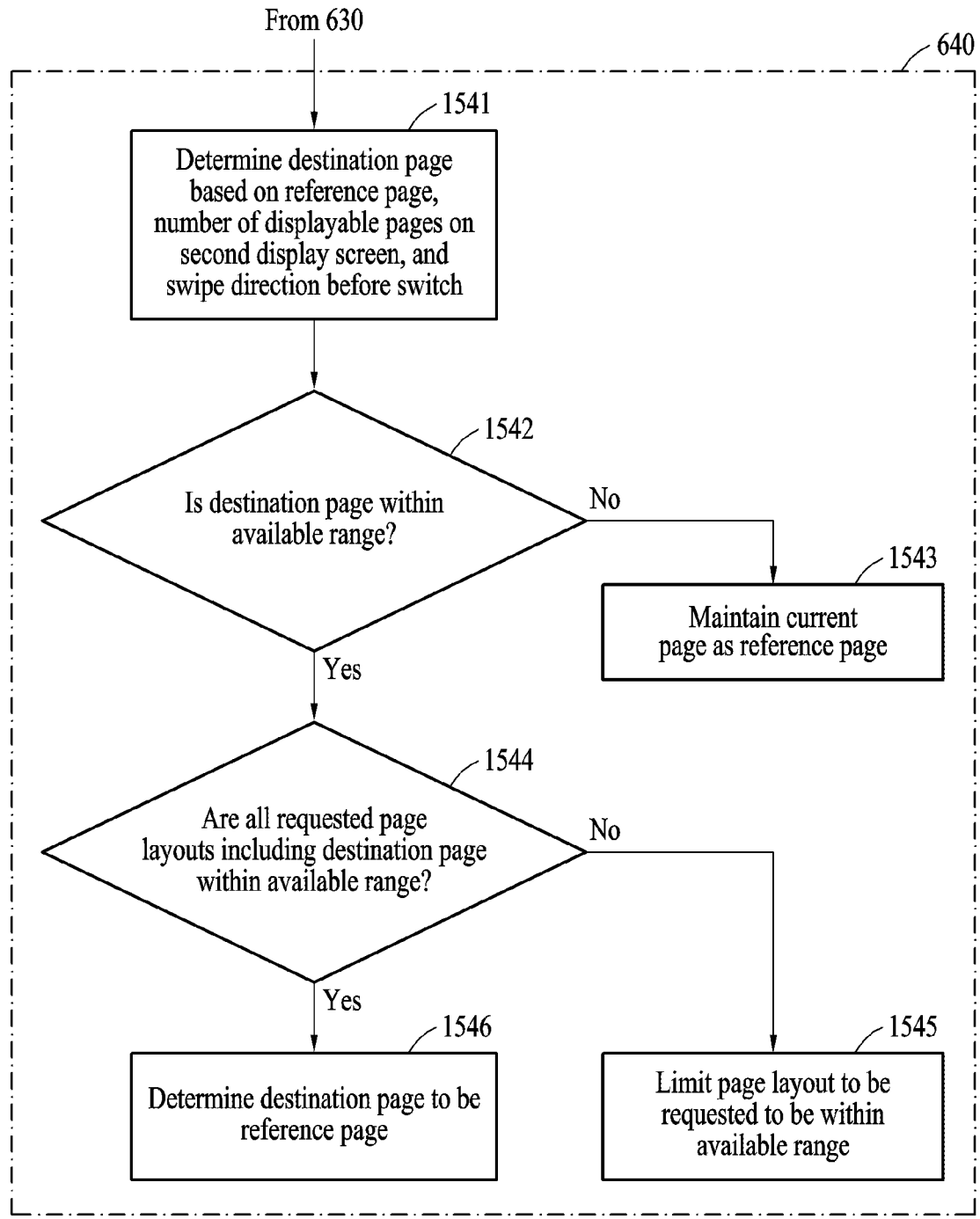
FIG. 15 is a flowchart illustrating an example operation of switching a page layout based on an available range according to various embodiments.

FIG. 15 is a flowchart illustrating an example of switching a page layout based on an available range according to various embodiments.

In operation 1541, an electronic device may determine a destination page based on a reference page before a switch, the number of pages displayable on a second display screen, and a swipe direction. For example, the electronic device may determine a destination page index corresponding to a destination page layout through toPage=CurrentPage+ (ScrollDelta*VisiblePageCount). In this example, toPage may indicate the destination page index. CurrentPage may indicate an index indicating the reference page before the switch. ScrollDelta may indicate a value determined based on the swipe direction. VisiblePageCount may indicate the number of displayable pages of the second display screen. When a swipe input in one direction (e.g., a direction from right to left) is detected, ScrollDelta may be set to +1, and VisiblePageCount may be set to 2 for the second display screen capable of outputting up to two page layouts. In this example, the target page index may be determined to be toPage=CurrentPage+2. For example, in the case of an operation on a first display screen, VisiblePageCount may be set to 1.

In operation 1542, the electronic device may determine whether the destination page is within an available range. For example, the electronic device may determine whether the destination page index determined in operation 1541 is within the available range. The available range may refer to a range of page indices determined based on the total number of page layouts. For example, when the total number of pages is n, the available range may be 0 or greater and n−1 or less. In operation 1543, when the destination page index exceeds the available range, the electronic device may maintain a current page as the reference page. The electronic device may restore toPage to be an index indicating the current page. That is, the electronic device may continue to output current page layouts on the second display screen without a screen switch. That the destination page index is out of the available range may be because the current page is a first page or a last page.

In operation 1544, when the destination page is within the available range, the electronic device may determine whether all requested page layouts including the destination page are within the available range based on the number of displayable pages on the second display screen. For example, when an index indicating a current page layout C is 2, the destination page index determined in operation 1542 may be 4. In this example, the destination page layout may be a page layout E. However, since the number of displayable pages on the second display screen is 2, page indices corresponding to the requested page layouts may be 4 and 5. When the total number of page layouts is 5, the available range may be 0 or greater and 4 or less, and a page index of 5 may exceed this available range.

In operation 1545, when at least one of the requested page layouts exceeds the available range, the electronic device may limit a page layout to be requested to be within the available range. For example, the electronic device may limit a page index of an end page layout to a boundary index of the available range (e.g., 0 or n−1 in the available range of 0 or greater and n−1 or less). The end page layout may refer to a page layout disposed at a boundary among page layouts output on the second display screen, and may be a leftmost page layout or a rightmost page layout, for example. In operation 1544, the electronic device may limit the page index to be requested to 3 and 4 in the foregoing example. Accordingly, as described above with reference to FIG. 10B, the electronic device having page layouts A through E may switch the second display screen to output page layouts D and E from page layouts C and D. An operation of switching a current page to a subsequent page in response to a swipe input swiping from left to right is mainly described herein, but examples are not limited thereto. For example, the description may also be applicable to an operation of switching the current page to a previous page in response to a swipe input swiping in an opposite direction.

In operation 1546, the electronic device may determine the destination page to be the reference page. For example, when all page layouts to be switched are within the available range, the electronic device may determine the destination page layout determined based on the number of displayable pages on the second display screen to be the reference page layout and output the determined reference page layout on a reference page area (refer to FIG. 9).

Figure 16:
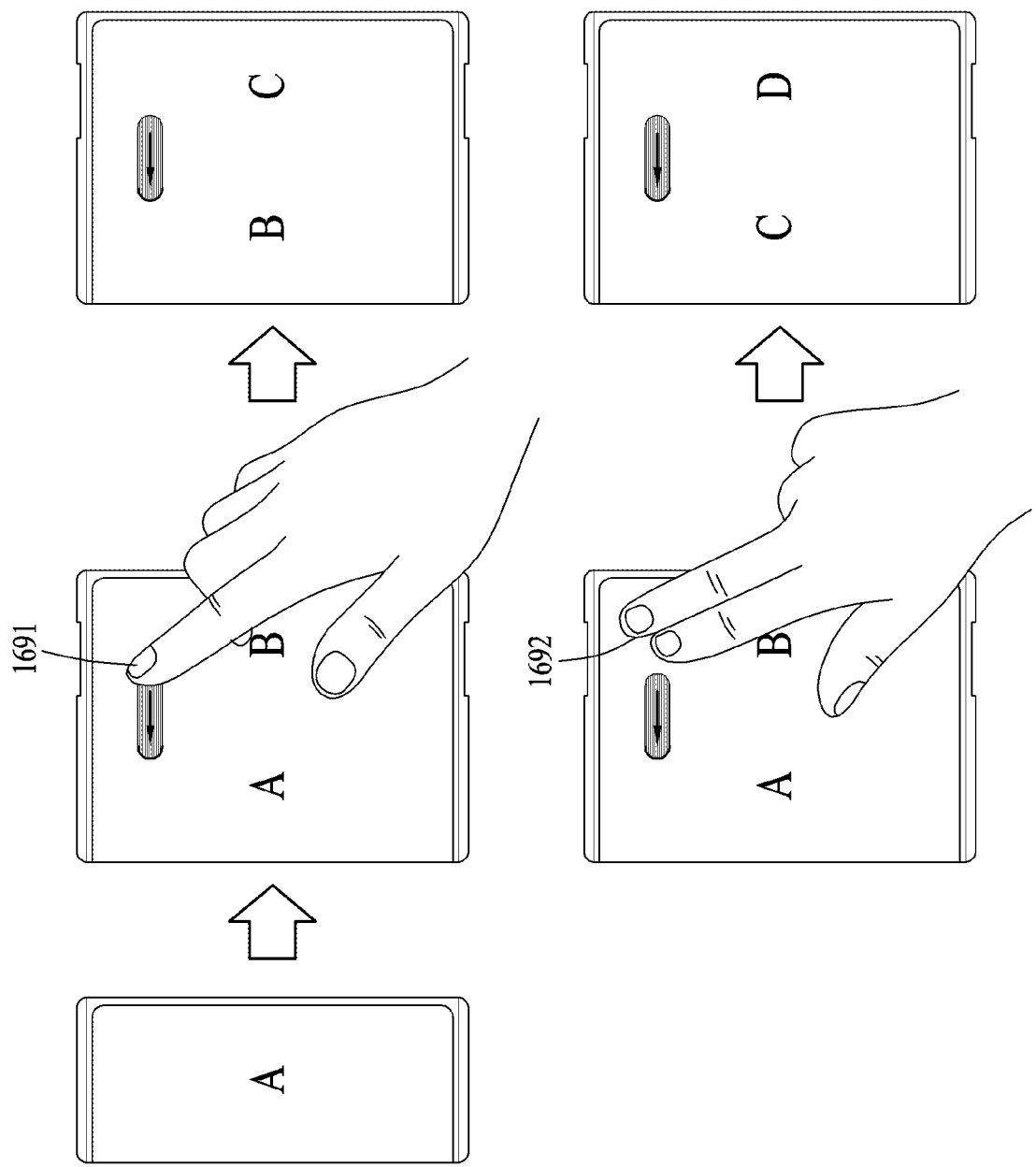
FIG. 16 is a diagram illustrating an example of switching a page layout based on a user input according to various embodiments.

FIG. 16 is a diagram illustrating an example of switching a page layout based on a user input according to various embodiments.

According to an example embodiment, an electronic device may determine, to be a destination page layout, a page layout of an index spaced apart from an index of a reference page layout by an interval that is based on a touch formation number of a screen switch input, among a plurality of page layouts included in a first view layout. For example, the electronic device may switch a single page layout (e.g., one page layout) in response to a single touch swipe 1691 moving with a single touch point formed. In the example of FIG. 16, as a page layout A disappears, the electronic device may output a page layout C. For another example, the electronic device may group and switch a plurality of page layouts (e.g., two page layouts) in response to a multi-touch swipe 1692 moving with two or more touch points formed. In the example of FIG. 16, the page layout A and a page layout B may disappear, and grouped page layouts C and D may be output.

However, examples are not limited thereto. The electronic device may determine, to be the destination page layout, a page layout of an index spaced apart from an index of a reference page layout by an interval that is based on a movement velocity of a screen switch input, among a plurality of page layouts included in a first view layout. For example, when detecting a movement velocity exceeding a multi-movement threshold velocity, the electronic device may group and move a plurality of page layouts. For another example, when detecting the movement velocity equal to or less than the multi-threshold velocity, the electronic device may move only a single page layout. Also, the electronic device may increase the number of pages to be turned over in proportion to the movement velocity of the swipe input.

Figure 17:
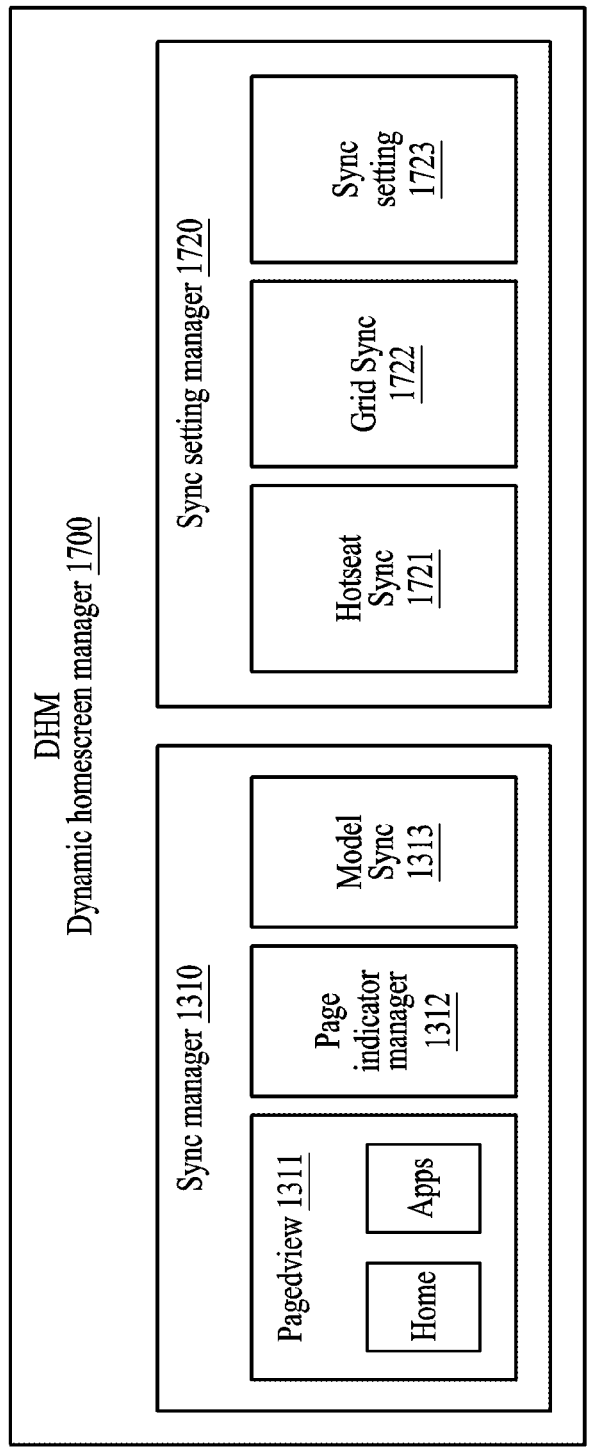
FIG. 17 is a diagram illustrating an example of setting synchronization in a DHM according to various embodiments.

FIG. 17 is a block diagram illustrating an example configuration of a DHM for setting synchronization according to various embodiments. FIGS. 18A, 18B, 18C and 18D (which may be referred to as FIGS. 18A through 18D, and FIGS. 19A, 19B and 19C (which may be referred to as FIGS. 19A through 19C) are diagrams illustrating examples of synchronization of item arrangement between a first display screen and a second display screen according to various embodiments.

A DHM 1700 (e.g., the DHM 1300 of FIG. 13) may further include a sync setting manager 1720 in addition to the sync manager described above. The sync setting manager 1720 may include a hotseat synch module 1721, a grid synch module 1722, and a synch setting module 1723, each of which may include various processing circuitry and/or executable program instructions. The hotseat synch module 1721 may manage items to be synchronized in a hotseat area. Operations of the hot seat synch module 1721 will be described in greater detail below with reference to FIGS. 18A through 18D. The grid synch module 1722 may manage a grid configuration according to the synchronization setting, which will be described in greater detail below with reference to FIGS. 19A through 19C. The synch setting module 1723 may manage configuration data in response to synchronization being activated or inactivated, which will be described in greater detail below with reference to FIGS. 20A and 20B.

For example, when an arrangement of items is synchronized between a first display screen and a second display screen, an electronic device may output, on the second display screen, an item arranged in at least one of a page area and a hotseat area of the first display screen. Hereinafter, examples of synchronization of a hotseat area will be described with reference to FIGS. 18A through 18D.

Figure 18A:
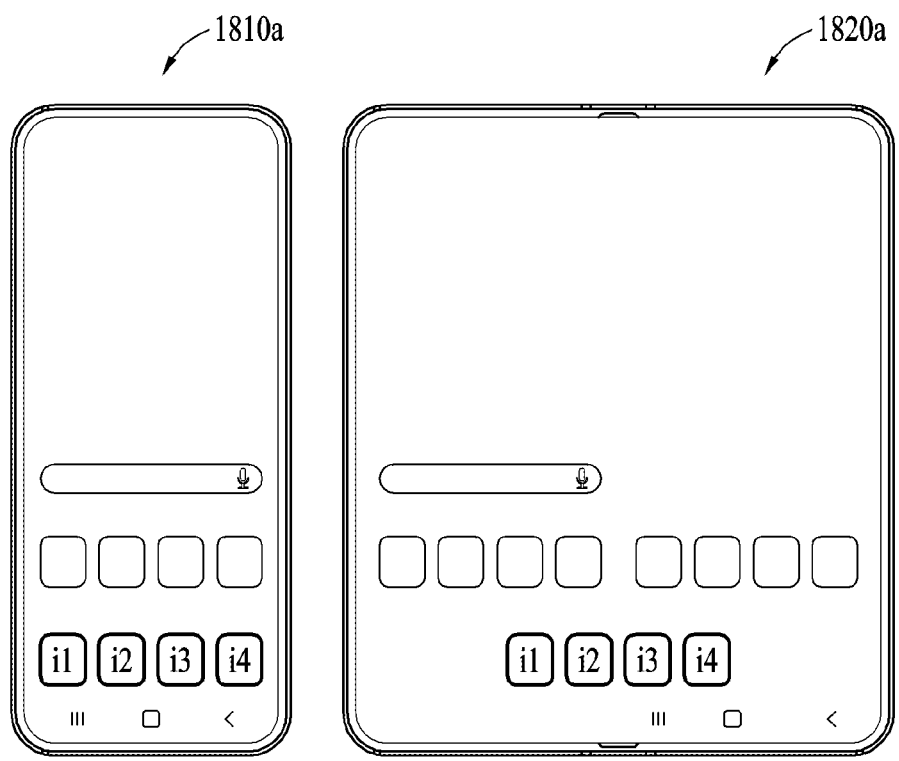
FIGS. 18A, 18B, 18C and 18D, and 19A, 19B and 19C are diagrams illustrating examples of synchronization of item arrangement between a first display screen and a second display screen according to various example embodiments.
Figure 18B:
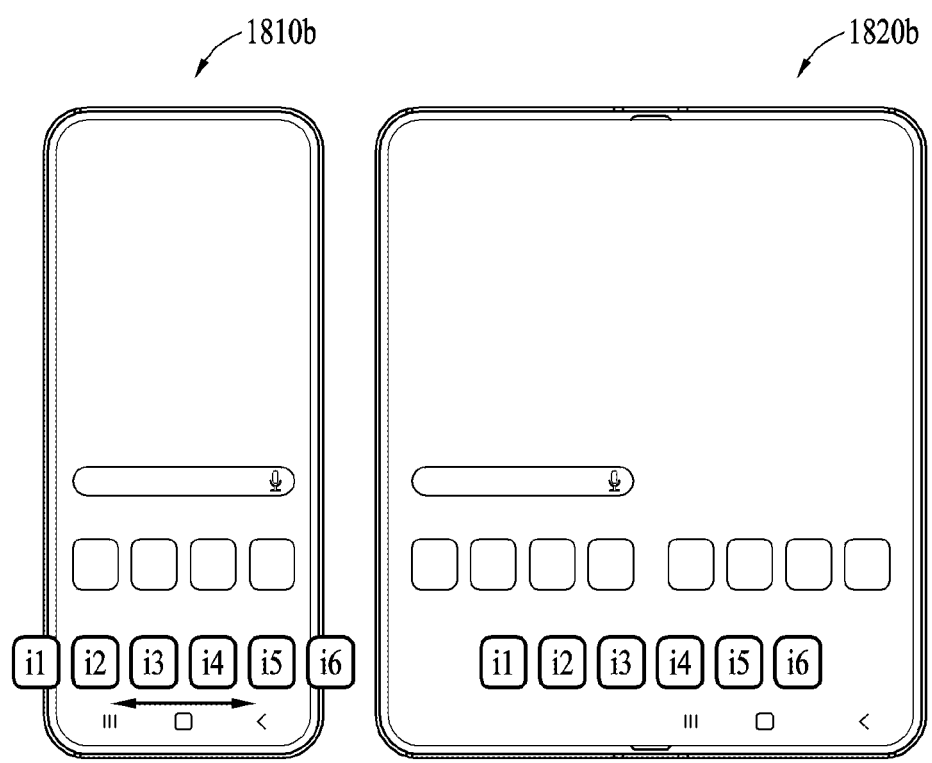

FIG. 18A illustrates an example where items on a page area and a hotseat area of a first display screen 1810a are synchronized on a second display screen 1820a. For example, the electronic device may output items i1, i2, i3, and i4 in the hotseat area of the first display screen 1810a and output also the items i1, i2, i3, and i4 in a hotseat area of the second display screen 1820a. The electronic device may maintain the same items i1, i2, i3, i4, i5, and i6 output in respective hotseat areas of a first display screen 1810b and a second display screen 1820b, as illustrated in FIG. 18B. However, on the first display screen 1810b of FIG. 18B, some items (e.g., i1 and i6) may be hidden from view due to a limited display area of the first display screen 1810b. In this case, the electronic device may expose the hidden items i1 and i6 in response to a swipe input to the hotseat area of the first display screen 1810b.

Figure 18C:
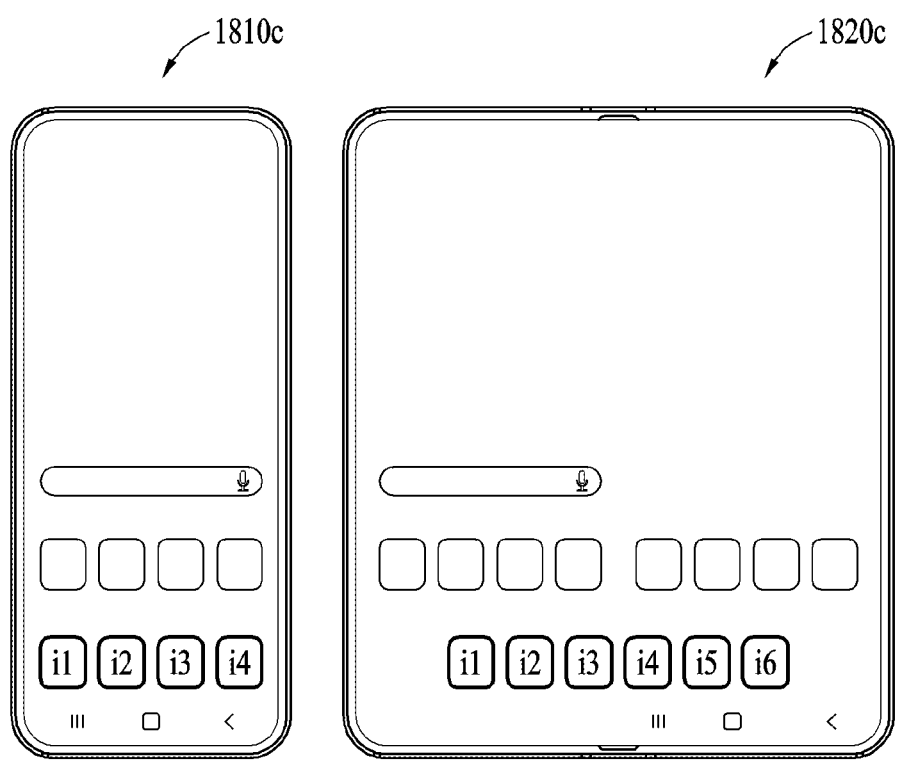

FIG. 18C illustrates an example where synchronization of hotseat areas of a first display screen 1810c and a second display screen 1820c is inactivated. In the example of FIG. 18C, the electronic device may synchronize items of page areas on the first display screen 1810c and the second display screen 1820c, but may separately manage the items of the hotseat areas for each display screen.

Figure 18D:
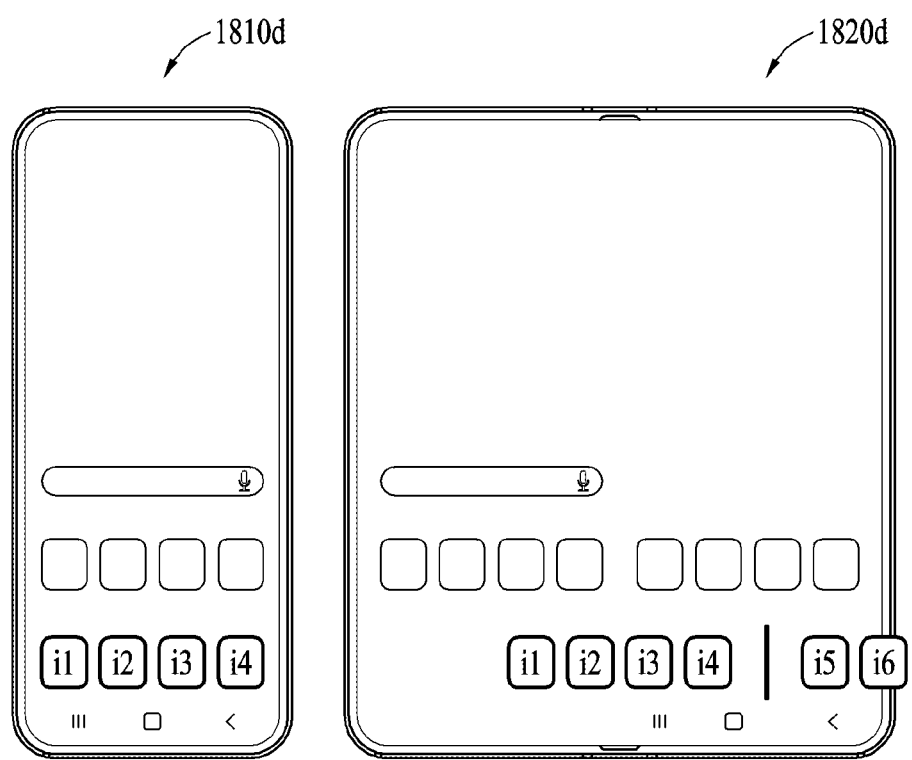

In the example of FIG. 18D, a synchronization zone and a non-synchronization zone may be distinguished in a hotseat area of a second display screen 1820d. For example, the electronic device may output items of the synchronization zone on the hotseat area of the second display screen 1820d to be the same as in a hotseat area of a first display screen 1810d. The electronic device may additionally output items of the non-synchronization zone on the hotseat area of the second display screen 1820d. The items of the non-synchronization zone may be added or removed in response to a user input. When some of the items of the non-synchronization zone are hidden due to a limited display area of the second display screen 1820d, the electronic device may expose the hidden items in response to a horizontal swipe input made to the non-synchronization zone.

Thus, by providing synchronization to at least a portion of a hotseat area, the electronic device may provide, on a second display screen, items expected by a user to be arranged on the second display screen at a switch from a first display screen to the second display screen in various ways. The electronic device may thus maintain consistency between a user experience from the first display screen and a user experience from the second display screen.

Figure 19A:
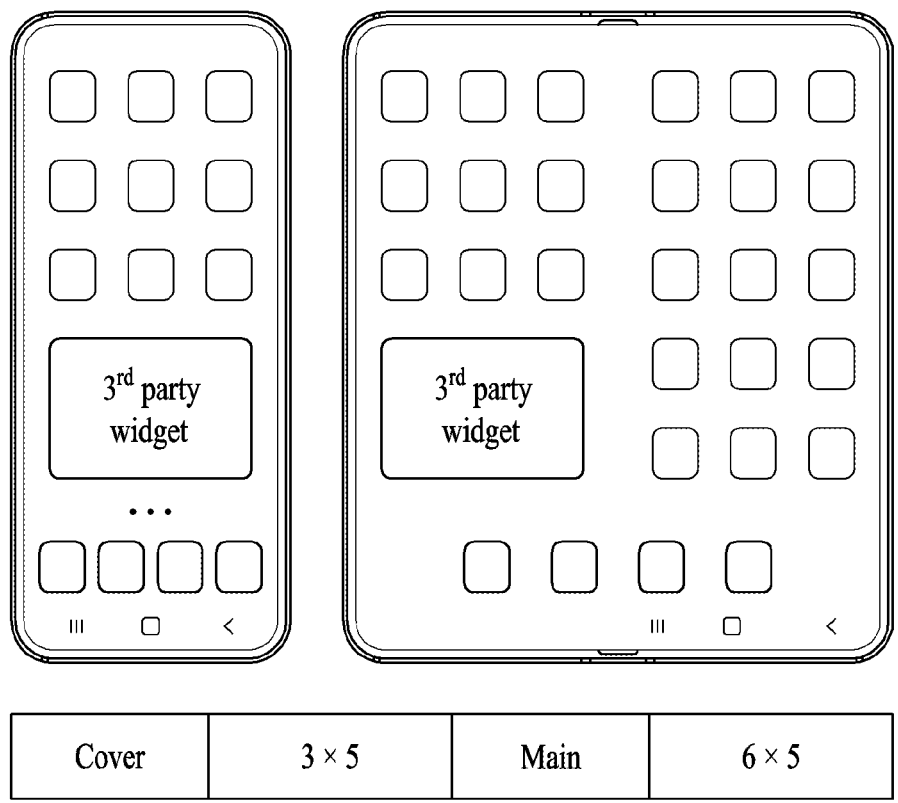
Figure 19B:
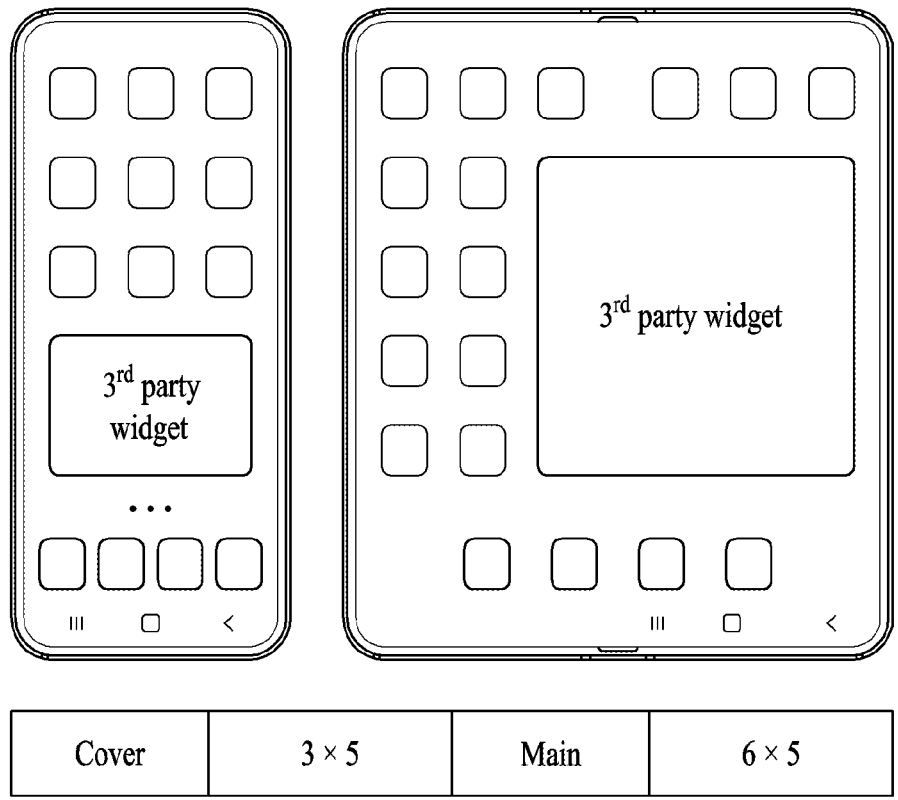
Figure 19C:
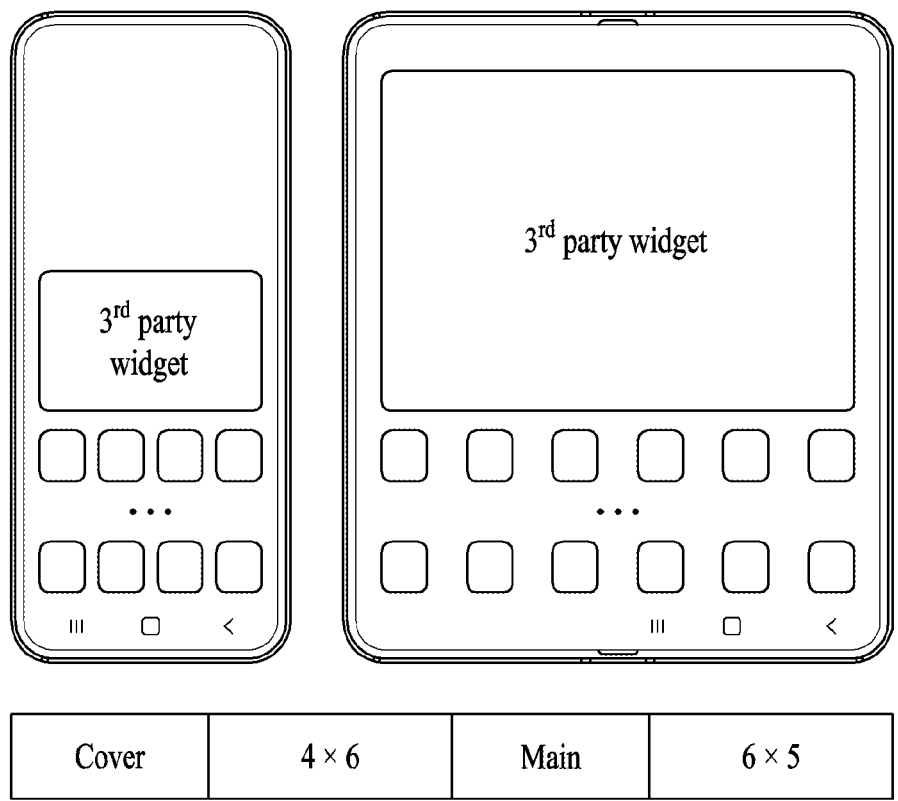

FIGS. 19A through 19C are diagrams illustrating examples of grid synchronization according to various embodiments.

For example, referring to FIG. 19A, the electronic device may determine a grid arrangement (e.g., 6×5) of a second display screen by copying a grid arrangement (e.g., 3×5) of a first display screen, in a state where a grid is fully synchronized in the electronic device. The electronic device with the grid fully synchronized may output, on the second display screen, a view layout that is based on an item arrangement of the first display screen, in response to a screen switch from the first display screen to the second display screen while the item arrangement is being synchronized between the first display screen and the second display screen. As illustrated in FIG. 19A, the electronic device may copy and output, onto the second display screen, the same item arrangement of a page layout of the first display screen, in addition to the grid arrangement of the first display screen.

The grid synchronization may be inactivated, and only the grid arrangement may be maintained the same as or similar to that illustrated in FIG. 19B. That is, even when the grid synchronization is inactivated, the electronic device may maintain the set grid arrangement of the second display screen. The item arrangement may be different from the example of FIG. 19A where the grid synchronization is activated. FIG. 19C illustrates an example where a grid arrangement and an item arrangement of a second display screen are configured independently of those of a first display screen. For example, although the grid arrangement of the first display screen is illustrated as 4×6, the grid arrangement of the second display screen may be set to 6×5 irrespective of the grid arrangement of the first display screen, as illustrated in FIG. 19C.

According to an example embodiment, when full synchronization is activated, the electronic device may copy items arranged on the first display screen onto the second display screen and arrange the items on the second display screen in the same way as arranged on the first display screen. When the full synchronization is inactivated, the electronic device may replicate a grid arrangement and item arrangement synchronized during synchronization to configuration data for the second display screen. An item change (e.g., addition, deletion, and position movement) occurring on the second display screen after the full synchronization is inactivated may be reflected only on the second display screen, without affecting the first display screen. Thus, the electronic device may prevent and/or reduce a loss of items when activating or inactivating the full synchronization.

Figure 20A:
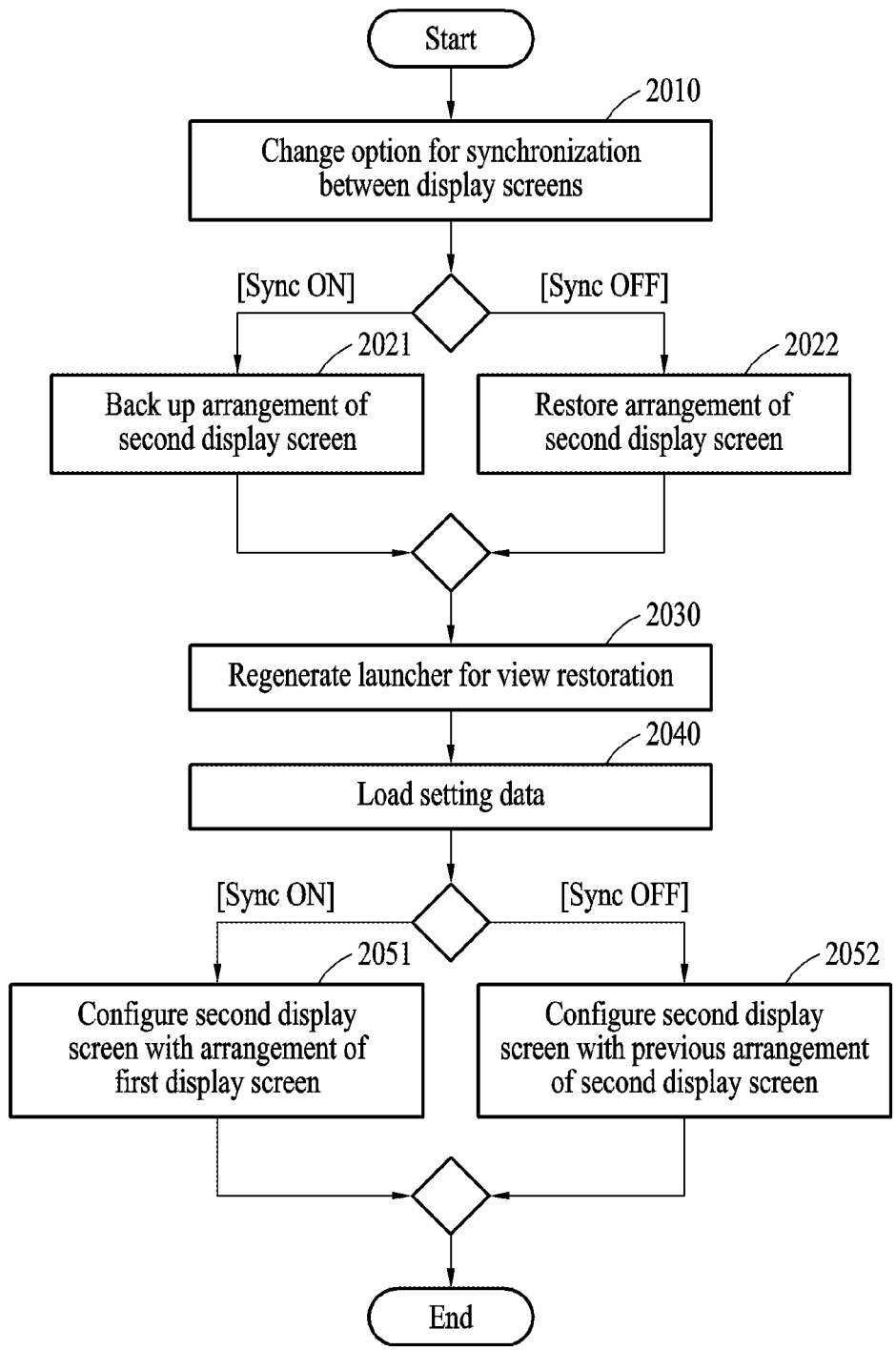
FIGS. 20A and 20B are flow diagrams illustrating example operations performed in response to activation and inactivation of synchronization according to various embodiments.
Figure 20B:
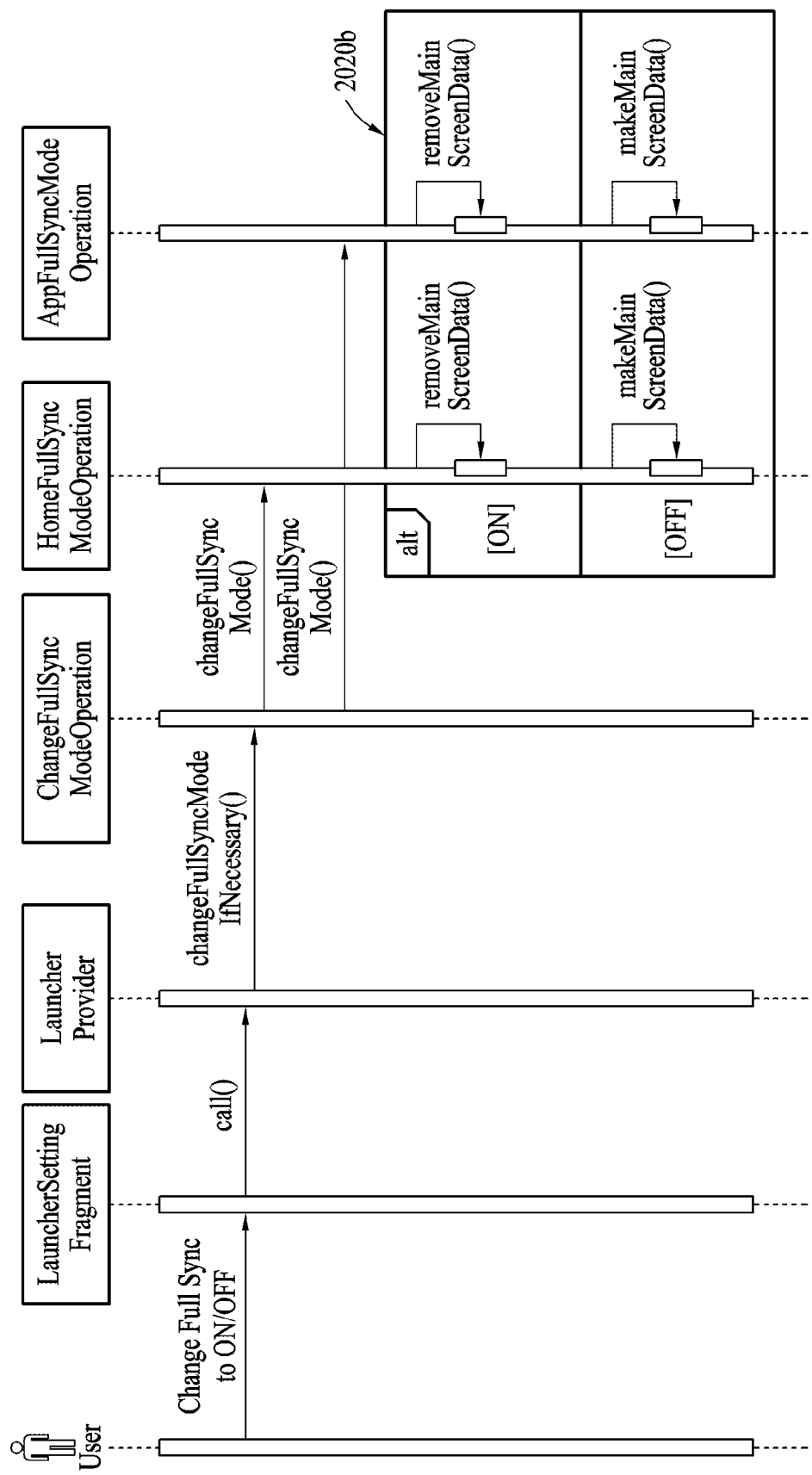

FIGS. 20A and 20B include a flowchart and signal flow diagram illustrating example operations performed in response to activation and inactivation of synchronization according to various embodiments.

FIG. 20A is a flowchart illustrating example operations performed for each synchronization option. In operation 2010, an electronic device may change an option for synchronization between display screens. The electronic device may perform an operation in a left portion when such a synchronization option is activated, and may perform an operation in a right portion when the synchronization option is inactivated.

In operation 2021, when the synchronization is activated, the electronic device may back up an arrangement of the second display screen. The electronic device may back up a previous arrangement of items on the second display screen when synchronization of an item arrangement between the first display screen and the second display screen is launched. After backing up the arrangement of the second display screen, the electronic device may delete configuration data of the second display screen (e.g., data of the set grid arrangement and item arrangement). In operation 2022, when the synchronization is inactivated, the electronic device may restore the arrangement of the second display screen. When the synchronization of the item arrangement between the first display screen and the second display screen is terminated, the electronic device may restore the backed up previous item arrangement for the second display screen. For example, the electronic device may load the configuration data for the second display screen backed up at the activation of the synchronization, and restore the previous grid configuration and item arrangement of the second display screen before the synchronization.

In operation 2030, the electronic device may regenerate a launcher for view restoration. For example, the electronic device may terminate the launcher and regenerate a launcher process. In operation 2040, the electronic device may load the configuration (e.g., setting) data. For example, when the synchronization is activated, the electronic device may load the configuration data of the first display screen. For another example, when the synchronization is inactivated, the electronic device may load the configuration data of the second display screen.

In operation 2051, the electronic device may configure the second display screen with the arrangement of the first display screen. For example, when the synchronization is activated, the electronic device may output, on the second display screen, a view layout in which page layouts of the first display screen are grouped by binding the configuration data of the first display screen to the second display screen.

In operation 2052, the electronic device may configure the second display screen with the previous arrangement of the second display screen. For example, when the synchronization is inactivated, the electronic device may output a page layout of the second display screen with the previous grid configuration and item arrangement based on the configuration data of the second display screen backed up before the launch of the synchronization.

FIG. 20B is a signal flow diagram illustrating an example function call process for the operations described above with reference to FIG. 20A according to various embodiments.

For example, the electronic device may receive an input selecting a synchronization option from a user through LauncherSettingsFragment. The electronic device may obtain a setting value of the synchronization option set by the user through a call method of LauncherProvider. The electronic device may transmit an event related to a mode change from LauncherProvider to ChangeFullSyncModeOperation. The electronic device may transmit the event to HomeFullSyncModeOperation and AppsFullSyncModeOperation, respectively, in order to change a homescreen requiring the mode change of full synchronization in ChangeFullSyncModeOperation. The electronic device may determine activation (e.g., an on state) and inactivation (e.g., an off state) of the synchronization, and may activate or inactivate the synchronization in each FullSyncModeOperation. For example, when the synchronization is activated in operation 2020b, the electronic device may back up and delete configuration data of the second display screen, in a similar way to what has been described above with reference to FIG. 20A. When the synchronization is inactivated, the electronic device may generate the configuration data of the second display screen. For example, when there is no configuration data to be restored, the electronic device may switch the second display screen with a default view layout. In response to a switch to a home-only mode from a state where the synchronization is activated while a homescreen and application screen mode is being used, there may be no configuration data in the home-only mode when the synchronization becomes inactivated.

For example, when inactivating the synchronization, the electronic device may restore a widget item used before the launch of the synchronization. When backing up, the electronic device may back up data of each widget.

In addition, when activating the synchronization, the electronic device may output data of a widget of the first display screen while maintaining it in the widget of the second display screen before launching the synchronization. However, examples are not limited thereto. For another example, the electronic device may provide new widget data (e.g., data different from widget data of a widget application on the first display screen) in the same widget application on the second display screen after the synchronization.

For example, when the widget application before the launch of synchronization is deleted while the synchronization is being activated, the electronic device may fail to restore the widget application even though the synchronization is inactivated. However, examples are not limited thereto. For another example, the electronic device may separately manage a widget present when the synchronization is activated and a widget present when the synchronization is inactivated, and may thus restore a backed up widget when the synchronization is inactivated.

Figure 21A:
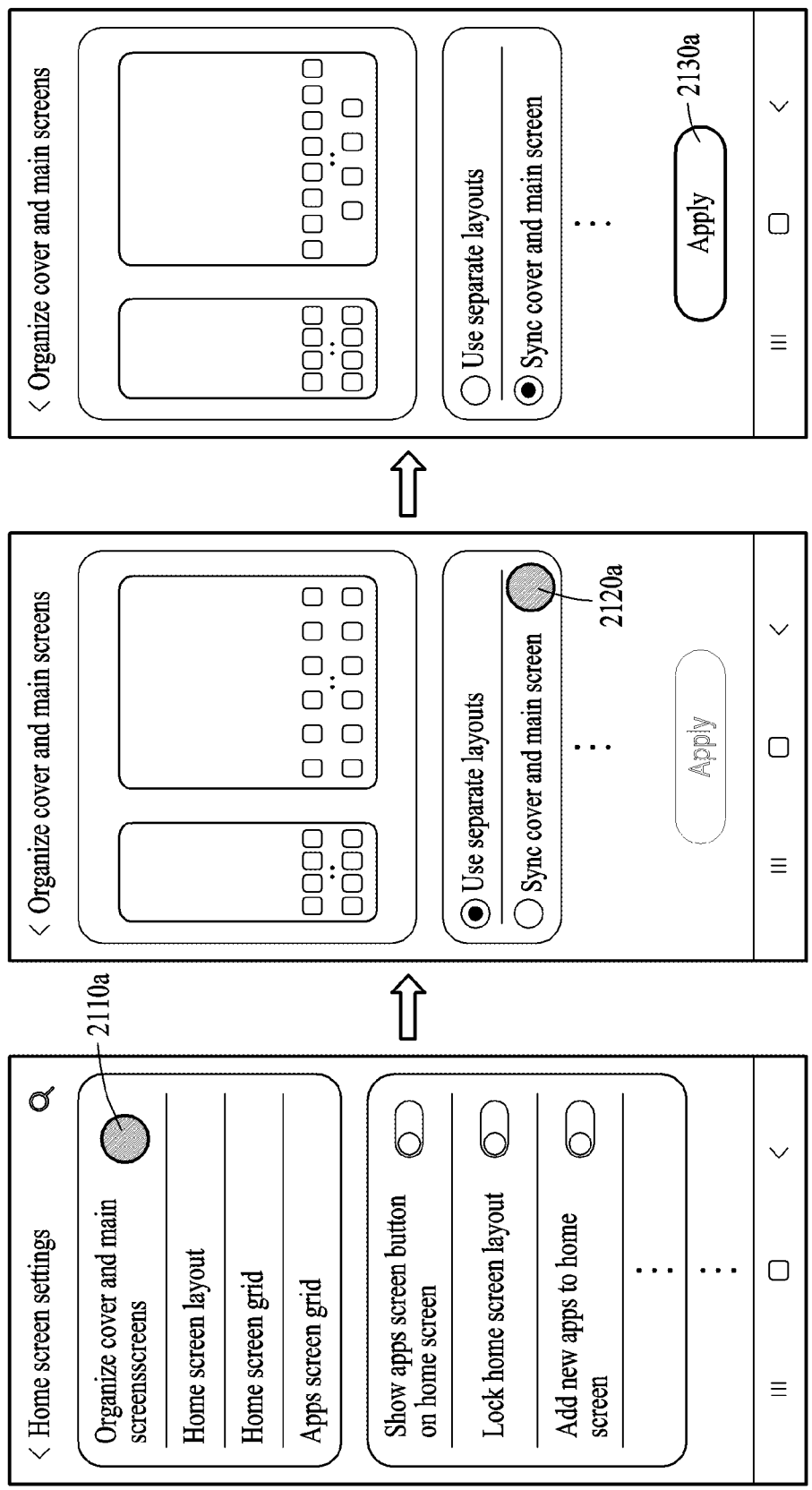
FIGS. 21A and 21B are diagrams illustrating examples of an interface for setting synchronization according to various embodiments.
Figure 21B:
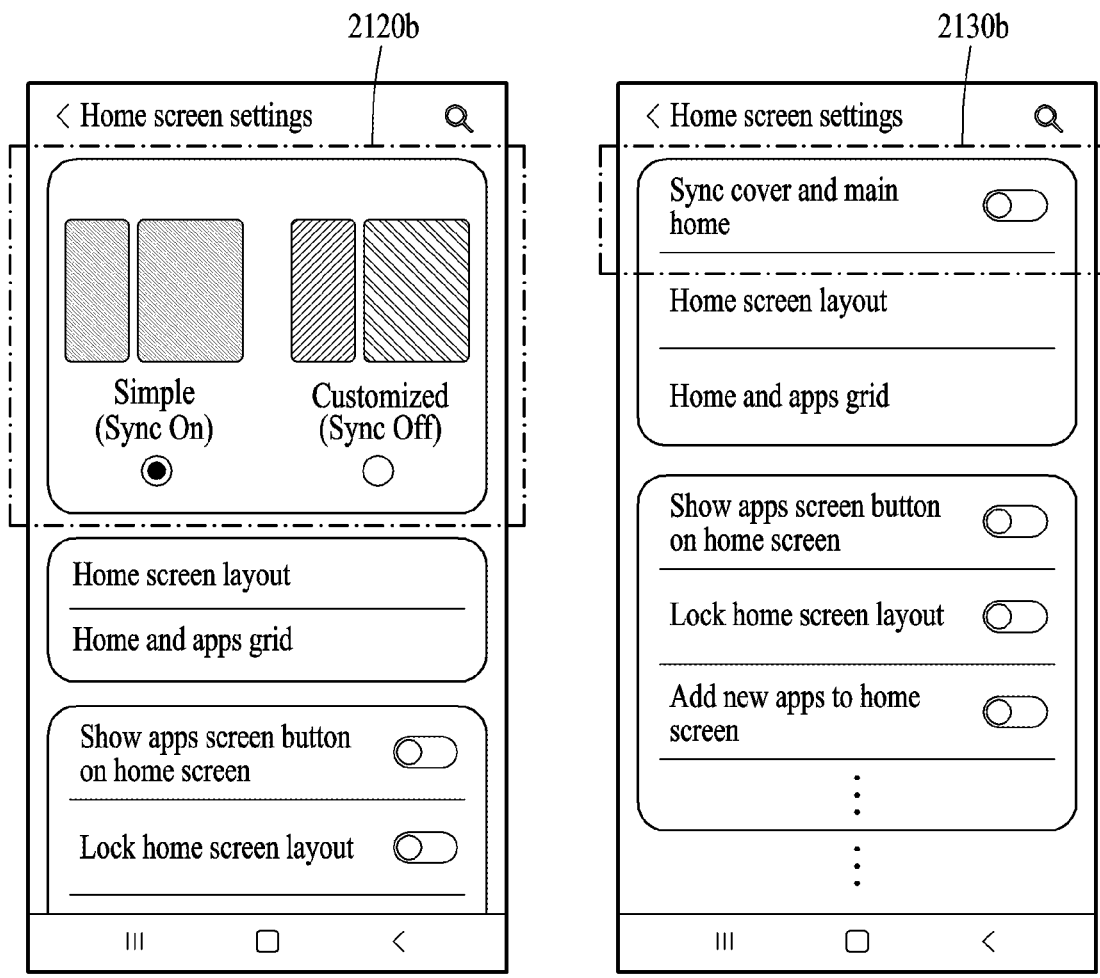

FIGS. 21A and 21B are diagrams illustrating examples of an interface for setting synchronization according to various embodiments.

According to an example embodiment, referring to FIG. 21A, in response to a synchronization option entering input 2110a, an electronic device may provide a synchronization option. In response to a synchronization setting input 2120a, the electronic device may provide a preview of a synchronized second display screen. In response to an applying input 2130a, the electronic device may apply the selected synchronization option. FIG. 21B illustrates another preview 2120b of applying synchronization, and an activation option object 2130b. The synchronization option may be provided in various forms.

While the disclosure has been illustrated and described with reference to various example embodiments, it will be understood that the various example embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A mobile communication device comprising:
   a housing including a first housing portion and a second housing portion, the first housing portion including a first surface and a second surface opposite to the first surface, and the second housing portion including a third surface and a fourth surface opposite to the third surface, the first surface and the third surface configured to face each other when the housing is fully folded;
   a first display accommodated at least partially in the first housing portion, the first display having a first size and configured to be substantially visible through the second surface;
   a second display accommodated at least partially in the first housing portion and the second housing portion, the second display having a second size larger than the first size and wherein the second display is configured to be substantially visible at the first surface and the third surface when the housing is at least partially unfolded; and
   a processor including processing circuitry configured to:
      while the housing is fully folded, display, via the first display, a first page layout of a group of page layouts arranged such that the first page layout is sequentially switchable to a second page layout and a third page layout of the group of page layout based on a first touch input on the first touch display; and
      while the housing is at least partially unfolded, display, via the second display, a first view layout of a group of view layouts arranged such that the first view layout is switchable to a second view layout of the group of view layouts based on a second touch input on the second display, the first view layout including the first page layout and the second page layout of the group of page layouts, and the second view layout including the third page layout of the group of page layouts;
      while the housing is fully folded, display, via the first display, a first hotseat area including a first group of application icons at a lower side of the first group of indicators; and
      while the housing is at least partially unfolded, display, via the second display, a second hotseat area having a first zone including a first set of application icons corresponding to the first group of application icons and a second zone having at least one additional application icon corresponding to an application that differs from applications corresponding to the first set of application icons,
      wherein application icons contained in the second hotseat area are separately manageable from application icons in the group of view layouts such that a user change to the application icons in the group of view layouts does not change application icons contained in the second hotseat area.

2. The mobile communication device of claim 1, wherein the processor is configured to:

while the housing is at least partially unfolded, display, via the second display, the second view layout switched from the first view layout of the group of view layouts based on a number of the group of page layouts.

3. The mobile communication device of claim 2, wherein the processor is configured to:
when the number of the group of page layouts is three, perform the displaying of the second view layout such that the second view layout includes the second page layout and the third page layout of the group of page layouts; and
when the number of the group of page layouts is four, perform the displaying of the second view layout such that the second view layout includes the third page layout and a fourth page layout different from the first page layout, the second page layout, and the third page layout of the group of page layouts.

4. The mobile communication device of claim 1, wherein the processor is configured to:
while the housing is fully folded, display, via the first display, a first group of indicators at a lower side of the one of the group of page layouts such that each of the first group of indicators corresponds to each of the group of page layouts, and that one of the first group of indicators corresponding to the one of the group of page layouts is visually different from the others of the first group of indicators while the one of the group of page layouts is displayed; and
while the housing is at least partially unfolded, display, via the second display, a second group of indicators at a lower side of one of the group of view layouts such that two of the second group of indicators corresponding to two of the group of page layouts included in the one of the group of view layouts are visually different from the others of the second group of indicators while the one of the group of view layouts is displayed.

5. The mobile communication device of claim 4, wherein the processor is configured to:
perform the displaying of the second group of icons such that the second group of icons are aligned in a direction substantially perpendicular to a folding axis of the housing.

6. The mobile communication device of claim 4, wherein the processor is configured to:
while the housing is at least partially unfolded, display, via the second display, a third group of icons at a upper side of the second group of indicators such that the third group of icons are arranged in a grid configuration.

7. The mobile communication device of claim 4, wherein the processor is configured to:
as at least part of the displaying of the second group of icons, display, via the second display, a split bar between the first group of icons and the at least one icon such that the first group of icons and the at least one icon are visually separated.

8. The mobile communication device of claim 1, wherein the first touch input includes a first swipe input from a left side to a right side of the first display or a second swipe input from the right side to the left side of the first display.

9. The mobile communication device of claim 1, wherein the second touch input includes a third swipe input from a left side to a right side of the second display or a fourth swipe input from the right side to the left side of the second display.

10. The mobile communication device of claim 1, wherein the first display has a first resolution lower than a second resolution of the second display.

* * * * *